United States Patent
Chen et al.

(10) Patent No.: US 11,907,569 B1
(45) Date of Patent: Feb. 20, 2024

(54) STORAGE DEVEICE THAT GARBAGE COLLECTS SPECIFIC AREAS BASED ON A HOST SPECIFIED CONTEXT

(71) Applicant: Radian Memory Systems, Inc., Manhattan Beach, CA (US)

(72) Inventors: Alan Chen, Simi Valley, CA (US); Craig Robertson, Simi Valley, CA (US); Robert Lercari, Thousand Oaks, CA (US); Andrey V. Kuzmin, Moscow (RU)

(73) Assignee: Radian Memory Systems, Inc., Manhattan Beach, CA (US)

( * ) Notice: Subject to any disclaimer, the term of this patent is extended or adjusted under 35 U.S.C. 154(b) by 0 days.

(21) Appl. No.: 17/948,161

(22) Filed: Sep. 19, 2022

Related U.S. Application Data

(63) Continuation of application No. 17/176,035, filed on Feb. 15, 2021, now Pat. No. 11,481,144, which is a continuation of application No. 16/702,736, filed on Dec. 4, 2019, now Pat. No. 10,956,082, which is a continuation of application No. 15/211,939, filed on Jul. 15, 2016, now Pat. No. 10,552,085, which is a continuation-in-part of application No. 14/848,273, filed on Sep. 8, 2015, now Pat. No. 10,642,505.

(Continued)

(51) Int. Cl.
G06F 3/06 (2006.01)

(52) U.S. Cl.
CPC ............ *G06F 3/0655* (2013.01); *G06F 3/061* (2013.01); *G06F 3/0679* (2013.01)

(58) Field of Classification Search
CPC ....... G06F 3/0655; G06F 3/061; G06F 3/0679

USPC ............. 711/103, 102; 365/189.05, 189.011
See application file for complete search history.

(56) References Cited

U.S. PATENT DOCUMENTS

| | | |
|---|---|---|
| 4,532,590 A | 7/1985 | Wallach |
| 4,813,002 A | 3/1989 | Joyce |

(Continued)

FOREIGN PATENT DOCUMENTS

WO 2009100149 A1 8/2009

OTHER PUBLICATIONS

NVM Express, Version 1.0b, Jul. 12, 2011, pp. 1-126, published at http://www.nvmexpress.org/resources/ by the NVM Express Work Group.

(Continued)

*Primary Examiner* — David Yi
*Assistant Examiner* — Zubair Ahmed
(74) *Attorney, Agent, or Firm* — Marc P. Schuyler

(57) ABSTRACT

A host stores "context" metadata for logical block addresses (LBAs) in a manner tied to physical location. Notwithstanding log-structured or copy on write processes, the host is then provided with immediate context when the host is called upon to assist a memory controller with data identified by physical location, for example, for memory reconfiguration, garbage collection, wear leveling or other processes. The metadata for example can provide the host with insight as to which data may be moved to enhance performance optimization and where that data can be placed. In one embodiment, the host writes back one or more references that span multiple layers of indirection in concert with write of the underlying data; in another embodiment, the context can point to other metadata.

20 Claims, 7 Drawing Sheets

Related U.S. Application Data

(60) Provisional application No. 62/241,429, filed on Oct. 14, 2015, provisional application No. 62/199,969, filed on Jul. 31, 2015, provisional application No. 62/194,172, filed on Jul. 17, 2015, provisional application No. 62/048,162, filed on Sep. 9, 2014.

(56) References Cited

U.S. PATENT DOCUMENTS

| | | |
|---|---|---|
| 5,404,485 A | 4/1995 | Ban |
| 5,568,423 A | 10/1996 | Jou et al. |
| 5,652,857 A | 7/1997 | Shimoi et al. |
| 5,860,082 A | 1/1999 | Smith et al. |
| 6,118,724 A | 9/2000 | Higgenbottom |
| 6,134,631 A | 10/2000 | Jennings, III |
| 6,145,069 A | 11/2000 | Dye |
| 6,148,354 A | 11/2000 | Ban |
| 6,430,650 B1 | 8/2002 | Miyauchi |
| 6,571,312 B1 | 5/2003 | Sugai |
| 7,096,378 B2 | 8/2006 | Stence et al. |
| 7,339,823 B2 | 3/2008 | Nakayama et al. |
| 7,383,375 B2 | 6/2008 | Sinclair |
| 7,404,031 B2 | 7/2008 | Oshima |
| 7,581,078 B2 | 8/2009 | Ware |
| 7,702,846 B2 | 4/2010 | Nakanishi et al. |
| 7,710,777 B1 | 5/2010 | Mintierth |
| 7,752,381 B2 | 7/2010 | Wong |
| 7,801,561 B2 | 9/2010 | Parikh et al. |
| 7,814,262 B2 | 10/2010 | Sinclair |
| 7,818,489 B2 | 10/2010 | Karamcheti et al. |
| 7,836,244 B2 | 11/2010 | Kim et al. |
| 7,861,122 B2 | 12/2010 | Cornwell et al. |
| 7,934,074 B2 | 4/2011 | Lee |
| 7,941,692 B2 | 5/2011 | Royer et al. |
| 7,970,983 B2 | 6/2011 | Nochimowski |
| 7,991,944 B2 | 8/2011 | Lee et al. |
| 8,001,318 B1 | 8/2011 | Iyer |
| 8,024,545 B2 | 9/2011 | Kim et al. |
| 8,055,833 B2 | 11/2011 | Danilak et al. |
| 8,065,471 B2 | 11/2011 | Yano et al. |
| 8,065,473 B2 | 11/2011 | Ito et al. |
| 8,068,365 B2 | 11/2011 | Kim |
| 8,072,463 B1 | 12/2011 | Van Dyke |
| 8,074,022 B2 | 12/2011 | Okin et al. |
| 8,082,389 B2 | 12/2011 | Fujibayashi |
| 8,086,790 B2 | 12/2011 | Roohparvar |
| 8,195,912 B2 | 6/2012 | Flynn |
| 8,219,776 B2 | 7/2012 | Forhan |
| 8,291,151 B2 | 10/2012 | Sinclair |
| 8,291,295 B2 | 10/2012 | Harari |
| 8,347,042 B2 | 1/2013 | You |
| 8,423,710 B1 | 4/2013 | Gole |
| 8,495,280 B2 | 7/2013 | Kang |
| 8,572,331 B2 | 10/2013 | Shalvi |
| 8,668,894 B2 | 4/2014 | Kuehne |
| 8,700,961 B2 | 4/2014 | Lassa |
| 8,954,708 B2 | 2/2015 | Kim |
| 8,959,307 B1 | 2/2015 | Bruce |
| 8,996,796 B1 | 3/2015 | Karamcheti |
| 9,123,443 B2 | 9/2015 | Chung |
| 9,171,585 B2 | 10/2015 | Rajan |
| 9,229,854 B1 | 1/2016 | Kuzmin et al. |
| 9,286,198 B2 | 3/2016 | Bennett |
| 9,329,986 B2 | 5/2016 | Li |
| 9,335,939 B2 | 5/2016 | Bennett et al. |
| 9,400,749 B1 | 7/2016 | Kuzmin et al. |
| 9,405,621 B2 | 8/2016 | Yu |
| 9,432,298 B1 | 8/2016 | Smith |
| 9,519,578 B1 | 12/2016 | Kuzmin et al. |
| 9,542,118 B1 | 1/2017 | Lercari et al. |
| 9,565,269 B2 | 2/2017 | Malwankar |
| 9,575,672 B2 | 2/2017 | Yamamoto |
| 9,588,904 B1 | 3/2017 | Lercari et al. |
| 9,652,376 B2 | 5/2017 | Kuzmin et al. |
| 9,710,377 B1 | 7/2017 | Kuzmin et al. |
| 9,727,454 B2 | 8/2017 | Kuzmin et al. |
| 9,734,086 B2 | 8/2017 | Flynn |
| 9,785,572 B1 | 10/2017 | Lercari et al. |
| 9,858,008 B2 | 1/2018 | Liu |
| 10,067,866 B2 | 9/2018 | Sutardja |
| 10,445,229 B1 | 10/2019 | Kuzmin et al. |
| 10,552,058 B1 | 2/2020 | Jadon et al. |
| 10,552,085 B1 | 2/2020 | Chen et al. |
| 10,642,505 B1 | 5/2020 | Kuzmin et al. |
| 11,068,408 B2 | 7/2021 | Kim |
| 11,487,678 B2 | 11/2022 | Park |
| 11,500,766 B2 | 11/2022 | Bueb |
| 11,580,030 B2 | 2/2023 | Das |
| 2003/0028733 A1 | 2/2003 | Tsunoda et al. |
| 2003/0065866 A1 | 4/2003 | Spencer |
| 2005/0073884 A1* | 4/2005 | Gonzalez ............... G11C 8/08 365/185.02 |
| 2005/0144413 A1 | 6/2005 | Kuo et al. |
| 2006/0022171 A1 | 10/2006 | Maeda et al. |
| 2007/0058431 A1 | 3/2007 | Chung et al. |
| 2007/0233939 A1 | 10/2007 | Kim |
| 2007/0260811 A1 | 11/2007 | Merry, Jr. et al. |
| 2007/0283428 A1 | 12/2007 | Ma et al. |
| 2008/0082596 A1 | 4/2008 | Gorobets |
| 2008/0147964 A1 | 6/2008 | Chow et al. |
| 2008/0155204 A1 | 6/2008 | Qawami et al. |
| 2008/0189485 A1 | 8/2008 | Jung et al. |
| 2008/0195833 A1 | 8/2008 | Park |
| 2008/0307192 A1 | 12/2008 | Sinclair |
| 2009/0036163 A1 | 2/2009 | Kimbrell |
| 2009/0046533 A1* | 2/2009 | Jo ................... G06F 13/1694 365/230.03 |
| 2009/0083478 A1 | 3/2009 | Kunimatsu |
| 2009/0089482 A1 | 4/2009 | Traister |
| 2009/0089490 A1 | 4/2009 | Ozawa et al. |
| 2009/0172219 A1 | 7/2009 | Mardiks |
| 2009/0172250 A1 | 7/2009 | Allen et al. |
| 2009/0172257 A1 | 7/2009 | Prins et al. |
| 2009/0198946 A1 | 8/2009 | Ebata |
| 2009/0254705 A1 | 10/2009 | Abali et al. |
| 2009/0271562 A1 | 10/2009 | Sinclair |
| 2009/0300015 A1 | 12/2009 | Kazan et al. |
| 2009/0327602 A1 | 12/2009 | Moore et al. |
| 2010/0191779 A1 | 1/2010 | Hinrichs |
| 2010/0042655 A1 | 2/2010 | Tse et al. |
| 2010/0115172 A1 | 5/2010 | Gillingham et al. |
| 2010/0125702 A1 | 5/2010 | Lee |
| 2010/0161882 A1 | 6/2010 | Stern et al. |
| 2010/0162012 A1 | 6/2010 | Cornwell et al. |
| 2010/0182838 A1 | 7/2010 | Kim et al. |
| 2010/0199065 A1 | 8/2010 | Kaneda |
| 2010/0241866 A1 | 9/2010 | Rodorff |
| 2010/0262761 A1 | 10/2010 | Borchers et al. |
| 2010/0281230 A1 | 11/2010 | Rabii et al. |
| 2010/0287217 A1 | 11/2010 | Borchers et al. |
| 2010/0299494 A1 | 11/2010 | Van Acht |
| 2010/0329011 A1 | 12/2010 | Lee et al. |
| 2011/0033548 A1 | 2/2011 | Kimmel et al. |
| 2011/0040927 A1 | 2/2011 | Fuxa |
| 2011/0041039 A1 | 2/2011 | Harari |
| 2011/0055445 A1 | 3/2011 | Gee et al. |
| 2011/0138114 A1 | 6/2011 | Yen |
| 2011/0161784 A1 | 6/2011 | Sellinger et al. |
| 2011/0197023 A1 | 8/2011 | Wamitsu et al. |
| 2011/0238890 A1 | 9/2011 | Sukegawa |
| 2011/0238943 A1 | 9/2011 | Devendran et al. |
| 2011/0296133 A1 | 12/2011 | Flynn et al. |
| 2011/0314209 A1 | 12/2011 | Eckstein |
| 2012/0033519 A1 | 2/2012 | Confalonieri et al. |
| 2012/0059972 A1 | 3/2012 | Chen |
| 2012/0066441 A1 | 3/2012 | Weingarten |
| 2012/0131381 A1 | 5/2012 | Eleftheriou |
| 2012/0204079 A1 | 8/2012 | Takefman et al. |
| 2012/0221776 A1 | 8/2012 | Yoshihashi |
| 2012/0221781 A1 | 8/2012 | Frost |
| 2012/0246394 A1 | 9/2012 | Ou |
| 2013/0007343 A1 | 1/2013 | Rub |
| 2013/0013852 A1 | 1/2013 | Hou et al. |
| 2013/0019062 A1 | 1/2013 | Bennett et al. |

(56) References Cited

U.S. PATENT DOCUMENTS

| | | |
|---|---|---|
| 2013/0073816 A1 | 3/2013 | Seo et al. |
| 2013/0111295 A1 | 5/2013 | Li et al. |
| 2013/0124793 A1 | 5/2013 | Gyl et al. |
| 2013/0166825 A1 | 6/2013 | Kim et al. |
| 2013/0227201 A1 | 8/2013 | Talagala |
| 2013/0232297 A1 | 9/2013 | Tanaka |
| 2013/0242425 A1* | 9/2013 | Zayas .................... G11B 5/012 |
| 2013/0290619 A1 | 10/2013 | Knight |
| 2013/0297852 A1 | 11/2013 | Fai et al. |
| 2014/0047210 A1 | 2/2014 | Cohen |
| 2014/0047300 A1 | 2/2014 | Liang |
| 2014/0068197 A1* | 3/2014 | Joshi .................. G06F 12/0866 |
| | | 711/135 |
| 2014/0101371 A1 | 4/2014 | Nguyen et al. |
| 2014/0122781 A1 | 5/2014 | Smith et al. |
| 2014/0189209 A1 | 7/2014 | Sinclair et al. |
| 2014/0208004 A1 | 7/2014 | Cohen |
| 2014/0215129 A1 | 7/2014 | Kuzmin et al. |
| 2015/0113203 A1 | 4/2015 | Dancho et al. |
| 2015/0149789 A1 | 5/2015 | Seo et al. |
| 2015/0212938 A1 | 6/2015 | Chen et al. |
| 2015/0261456 A1 | 9/2015 | Alcantara et al. |
| 2015/0324264 A1 | 11/2015 | Vidypoornachy et al. |
| 2015/0347296 A1* | 12/2015 | Kotte .................... G06F 3/0679 |
| | | 711/103 |
| 2016/0018998 A1 | 1/2016 | Mohan et al. |
| 2016/0019148 A1 | 1/2016 | Vekiarides |
| 2016/0253091 A1 | 9/2016 | Ayyavu |
| 2016/0357462 A1 | 12/2016 | Nam et al. |
| 2016/0364179 A1 | 12/2016 | Tsai et al. |
| 2018/0046480 A1 | 2/2018 | Dong |
| 2020/0363996 A1 | 11/2020 | Kanno |
| 2021/0064293 A1 | 3/2021 | Cho |

OTHER PUBLICATIONS

John D. Strunk, "Hybrid Aggregates: Combining SSDs and HDDs in a single storage pool," Dec. 15, 2012, ACM SIGOPS Operating Systems Review archive, vol. 46 Issue 3, Dec. 2012, pp. 50-56.
Yiying Zhang, Leo Prasath Arulraj, Andrea C. Arpaci-Dusseau, Remzi H. Arpaci-Dusseau, Computer Sciences Department, University of Wisconsin-Madison, "De-indirection for Flash-based SSDs with NamelessWrites," published at https://www.usenix.org/conference/fast12/de-indirection-flash-based-ssds-nameless-writes, Feb. 7, 2012, pp. 1-16.
Andrea C. Arpaci-Dusseau, Remzi H. Arpaci-Dusseau, and Vijayan Prabhakaran, "ResearchRemoving The Costs Of Indirection in Flash-based SSDs with NamelessWrites," Jun. 22, 2010, pp. 1-5, published at www.cs.wisc.edu/wind/Publications/hotstorage 10-nameless.pdf by Computer Sciences Department, University of Wisconsin-Madison and Microsoft Research.
Stan Park and Kai Shen, Department of Computer Science, University of Rochester, "FIOS: A Fair, Efficient Flash I/O Scheduler," Feb. 23, 2012, pp. 1-15, published at www.usenix.org/event/fast12/tech/full_papers/Park.pdf by the Advanced Computing Systems Association, Fast'12, 10th Usenix Conference On File And Storage Technologies, San Jose.
Eric Seppanen, Matthew T. O'Keefe, David J. Lilja, Department of Electrical and Computer Engineering, University of Minnesota, "High Performance Solid State Storage Under Linux," Apr. 10, 2010, MSST '10 Proceedings of the 2010 IEEE 26th Symposium on Mass Storage Systems and Technologies (MSST), pp. 1-12.
Kiangyong Ouyangyz, David Nellansy, Robert Wipfely, David Flynny, Dhabaleswar K. Pandaz, "Beyond Block I/O: Rethinking Traditional Storage Primitives," Aug. 20, 2011, published at http://www.sciweavers.org/read/beyond-block-i-o-rethinking-traditional-storage-primitives-327868, by Fusion IO and the Ohio State University.
Intel Corp, PCI-SIG SR-IOV Primer—An Introduction to SR-IOV Technology,: 321211-002, Revision 2.5, Jan. 2011, 28 pages.

Open NAND Flash Interface (ONFI), specification, version 2.0, 174 pages, Feb. 27, 2008.
Open NAND Flash Interface (ONFI), specification, version 3.1, 296 pages Sep. 19, 2012.
NVM Express, V. 1.2.1, 217 pages, Jun. 3, 2016.
Garth Gibson, Greg Ganger, "Principles of Operation for Shingled Disk Devices," Canregie Mellon Parallel Data Laboratory, CMU-PDL-11-107, Apr. 2011, 9 pages.
Li-Pin Chang, "Hybrid Solid State Disks: Combining Heterogeneous NAND Flash in Large SSDs," National Chiao-Tung University, Taiwan, ASPDAC 2008, 26 pages.
Hua Wangx, Ping Huangxz, Shuang Hex, Ke Zhoux, Chunhua Lix, and Xubin He, "A Novel I/O Scheduler for SSD with Improved Performance and Lifetime," Mass Storage Systems and Technologies (MSST), 2013 IEEE 29th Symposium on, May 6-10, 2013, 5 pages.
Altera Corp et al., "Hybrid Memory Cube" specification, 2012, 122 pages.
JEDEC Standard, JESD229, Wide IO, Dec. 2011, 74 pages.
Li-Pin Chang, "Hybrid Solid State Disks: Combining Heterogeneous NAND Flash in Large SSDs," National Chiao-Tung University, Taiwan, 978-1-4244-1922-7/08, 2008 IEEE, 6 pages.
Optimizing NAND Flash Performance, Flash Memory Summit, Santa Clara, CA USA Aug. 2008, Ryan Fisher, pp. 1-23.
High-Speed NAND Flash: Design Considerations to Maximize Performance, Flash Memory Summit, Santa Clara, CA USA Aug. 11, 2009, , Robert Pierce, pp. 1-19.
NAND 201: An Update on the Continued Evolution of NAND Flash, Jim Cooke, Micron White Paper, Sep. 6, 2011, pp. 1-10.
Spansion SLC NAND Flash Memory for Embedded, data sheet, S34ML01G1, S34ML02G1, S34ML04G1, Sep. 6, 2012, pp. 1-73.
Wang et al., "An Efficient Design and Implementation of LSM-Tree based Key-Value Store on Open Channel SSD," EuroSys '14 Proceedings of the Ninth European Conference on Computer Systems, Article No. 16, Apr. 14, 2014, 14 pages.
Ouyang et al., "SDF: Software-defined flash for web-scale internet storage systems," Computer Architecture News—ASPLOS '14, vol. 42 Issue 1, Mar. 2014, 14 pages.
Macko et al., "Tracking Back References in a Write-Anywhere File System," FAST'10 Proceedings of the 8th USENIX conference on File and storage technologies, 14 pages, Feb. 23, 2010.
Ohad, Rodeh, "IBM Research Report Defragmentation Mechanisms for Copy-on-Write File-systems," IBM white paper, Apr. 26, 2010, 10 pages, available at domino.watson.ibm.com/library/CyberDig.nsf/papers/298A0EF3C2CDB17B852577070056B41F/$File/rj10465.pdf.
Lafi, Walid, et al., "High-level modeling and performance evaluation of address mapping in NAND flash memory," Jan. 2011, vol. 60-1, IEEE 978-1-4244-5091, pp. 659-662.
Im, Soojun et al., "Flash-aware RAID techniques for dependable and high-performance flash memory SSD," IEEE Transactions On Computers, pp. 80-82.
Kim, Jae-Hong et al., "A methodology for extracting performance parameters in solid state disks (SSDs)," 2009 IEEE International Symposium on Modeling, Analysis & Simulation of Computer and Telecommunication Systems, Dec. 28, 2009, DOI: 10.1109/MASCOT. 2009.5366154, 9 pages.
Kang et al., "A Superblock-based Flash Translation Layer for NAND Flash Memory," EMSOFT'06, Seoul, Korea, Oct. 22, 2006, ACM 1-59593-542-8/06/0010, pp. 161-170.
TN-29-28: Memory Management in NAND Flash Arrays, Micron publication, 2005, 10 pages, available from https://www.micron.com/-/media/client/global/documents/products/technical-note/nand-flash/tn2928.pdf.
Park et al., "A Reconfigurable FTL (Flash Translation Layer) Architecture for NAND Flash-Based Applications," 23 pages, ACM Transactions on Embedded Computing Systems, vol. 7, No. 4, Article 38, Publication date: Jul. 2008.
Gupta et al., "DFTL: A Flash Translation Layer Employing Demand-based Selective Caching of Page-level Address Mappings," ASPLOS'09, Mar. 7-11, 2009, Washington, DC, USA, 12 pages.

(56) References Cited

OTHER PUBLICATIONS

Ruia, Virtualization of Non-Volatile RAM, Texas A&M Masters Thesis, 77 pages, May 2015, available from: https://oaktrust.library.tamu.edu/bitstream/handle/1969.1/154981/RUIA-THESIS-2015.pdf?sequence=1&isAllowed=y.

Hsieh et al., "Efficient Identification of Hot Data for Flash Memory Storage Systems," ACM Transactions on Storage, vol. 2, No. 1, Feb. 2006, 19 Pages (pp. 22-40).

Wu et al., "An Adaptive Two-Level Management for the Flash Translation Layer in Embedded Systems," https://dl.acm.org/doi/pdf/10.1145/1233501.1233624, Date of Publication: Nov. 9, 2006.

Grupp et al., "Characterizing Flash Memory: Anomalies, Observations, and Applications," https://dl.acm.org/doi/pdf/10.1145/1669112.1669118, Dec. 16, 2006.

Huang et al., "Unified Address Translation for Memory-Mapped SSDs with FlashMap," https://dl.acm.org/doi/10.1145/2749469.2750420, Jun. 15, 2015.

Bang et al., "A Memory Hierarchy-Aware Metadata Management Technique for Solid State Disks," https://ieeexplore.ieee.org/document/6026485, Aug. 10, 2011.

\* cited by examiner

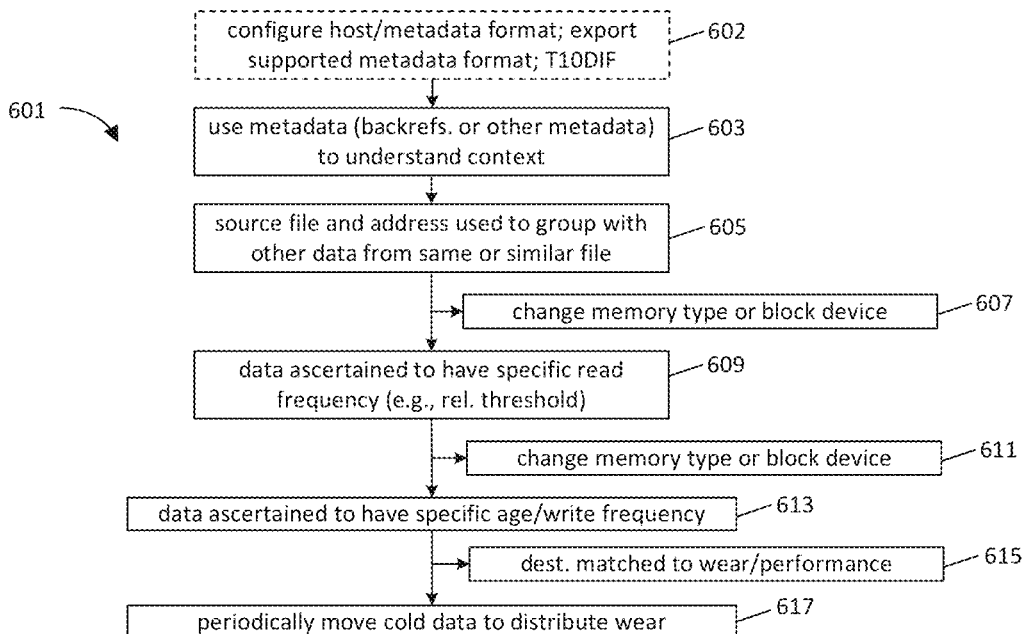
FIG. 6A
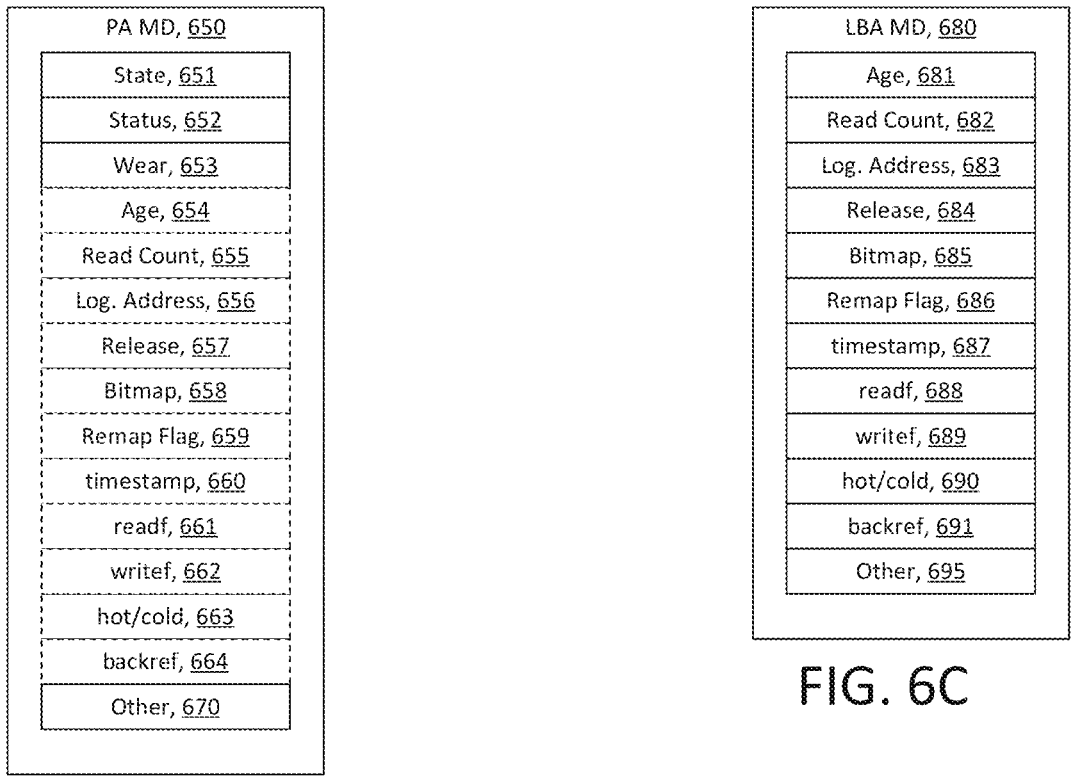
FIG. 6B
FIG. 6C

STORAGE DEVEICE THAT GARBAGE COLLECTS SPECIFIC AREAS BASED ON A HOST SPECIFIED CONTEXT

This document is a continuation of U.S. Utility patent application Ser. No. 17/176,035, filed on Feb. 15, 2021, on behalf of first-named inventor Alan Chen for "Techniques for Directed Data Migration," which in turn is a continuation of U.S. Utility patent application Ser. No. 16/702,736, filed on Dec. 4, 2019, on behalf of first-named inventor Alan Chen for "Techniques for Directed Data Migration" (now U.S. patent Ser. No. 10/956,082), which in turn is a continuation of U.S. Utility patent application Ser. No. 15/211, 939, filed on Jul. 15, 2016, on behalf of first-named inventor Alan Chen for "Techniques for Directed Data Migration" (now U.S. patent Ser. No. 10/552,085), which in turn is a continuation in-part of U.S. Utility patent application Ser. No. 14/848,273, filed on Sep. 8, 2015, on behalf of first-named inventor Andrey V. Kuzmin for "Techniques for Data Migration Based On Per-Data Metrics and Memory Degradation" (now U.S. patent Ser. No. 10/642,505), which in turn claims the benefit of U.S. Provisional Patent Application No. 62/048,162, filed on Sep. 9, 2014, on behalf of first-named inventor Andrey V. Kuzmin for "Techniques for Data Migration Based On Per-Data Metrics and Memory Degradation." U.S. Utility application Ser. No. 15/211,939 also claims the benefit of: U.S. Provisional Patent Application No. 62/199, 969, filed on Jul. 31, 2015, on behalf of first-named inventor Robert Lercari for "Expositive Flash Memory Control;" U.S. Provisional Patent Application No. 62/194,172, filed on Jul. 17, 2015, on behalf of first-named inventor Robert Lercari for "Techniques for Memory Controller Configuration;" and U.S. Provisional Patent Application No. 62/241, 429, filed on Oct. 14, 2015, on behalf of first-named inventor Robert Lercari for "Techniques for Directed Data Migration." The foregoing patent applications are hereby incorporated by reference, as are U.S. Patent Publication 2014/ 0215129, for "Cooperative Flash Memory Control," U.S. Utility patent application Ser. No. 14/047,193, filed on Oct. 7, 2013, on behalf of first-named inventor Andrey V. Kuzmin for "Multi-Array Operation Support And Related Devices, Systems And Software" (now U.S. Pat. No. 9,229, 854) and U.S. Utility patent application Ser. No. 14/880,529, filed on Oct. 12, 2015, on behalf of first-named inventor Robert Lercari for "Expositive Flash Memory Control" (now U.S. Pat. No. 9,542,118).

This disclosure relates to storage systems and, more specifically, to the architecture of storage systems that utilize nonvolatile memory storage media. Still more particularly, the present disclosure relates to techniques for storing "context" information in memory along with data writes corresponding to a logical block address in a manner such that, as maintenance or other operations are performed to migrate logical block addresses to different physical memory locations, the context is maintained in a manner amenable to later provision to a host. Such an architecture permits a host to understand the context of data found at any given physical memory location, notwithstanding that a host on its own might not be in a position to readily understand the origins of the data at a random physical address. The disclosed techniques are especially relevant to systems that intelligently store certain logical addresses in specially selected storage locations, for performance, wear or other considerations.

BACKGROUND

Storage systems, from embedded to datacenter, utilize storage media (or "memory") to store user data written to the system and to retrieve that data on a user's request. Storage systems can be homogeneous, built from the uniform storage media with the same access and/or endurance characteristics, or heterogeneous, comprising multiple media types as distinguished by their latency, throughput, endurance or other performance factors. Some storage schemes try to improve storage efficiency by organizing media of the same type into tiers, with each tier characterized by its underlying media type-specific features. For example, in personal computer systems, dynamic random access memory ("DRAM") provides very quick access but does not retain data once power is removed, whereas a hard disk drive ("HDD") provides relatively slow access compared to DRAM but retains data once power is removed; some systems thus try to store frequently used/overwritten data in DRAM, for quick access and performance while the computer is in active use, and to store data that is less frequently needed or where slower input/output performance can be tolerated in slower memory, such as an HDD.

Note that while data type (e.g., frequently updated operating parameters, read-only data and so forth) provides one relatively straightforward example of data that can be organized into different tiers, there exist many situations where data type is unclear, or where characteristics associated with the data and its associated logical address (e.g., "context") are not clearly and immediately understood by the host or the storage system. A block of data found at a random physical memory location might have no clearly delineated "file type" that can be understood, without more information, by a processor. This is especially the case for storage systems which rely on address translation to store and access data at a physical location that is unknown to the host (e.g., that use virtual and/or logical-to-physical translation, or that otherwise use a log-structured or copy on write file system). Thus, even if data could ultimately be traced back to its source application to understand context of data, without special processes for performing this tracing, the context of data cannot be readily understood by a host or memory controller.

What is needed are techniques for more efficiently managing operation of memory and, more specifically, of providing context to a host, memory controller or another device in a manner that does not require extensive host mechanisms for tracking context. The present invention addresses these needs and provides further, related advantages.

BRIEF DESCRIPTION OF THE FIGURES

FIG. 4A provides one example of how metadata (including context information) can be managed by a memory controller for later provision to a host.

FIG. 4B provides one example of how metadata (including context information) can be managed by a memory controller for later provision to a host.

FIG. 4C provides one example of how metadata (including context information) can be managed by a memory controller for later provision to a host.

FIG. 6A is a diagram that shows possible host actions which relate to context (e.g., metadata and other information that can be used by the host to understand the nature of data located at a particular physical memory location).

FIG. 6B is a diagram that illustrates some exemplary types of metadata that can be stored according to physical address (PA).

FIG. 6C is a diagram that illustrates some exemplary types of metadata that can be stored according to logical block address (LBA).

Figure 1A:
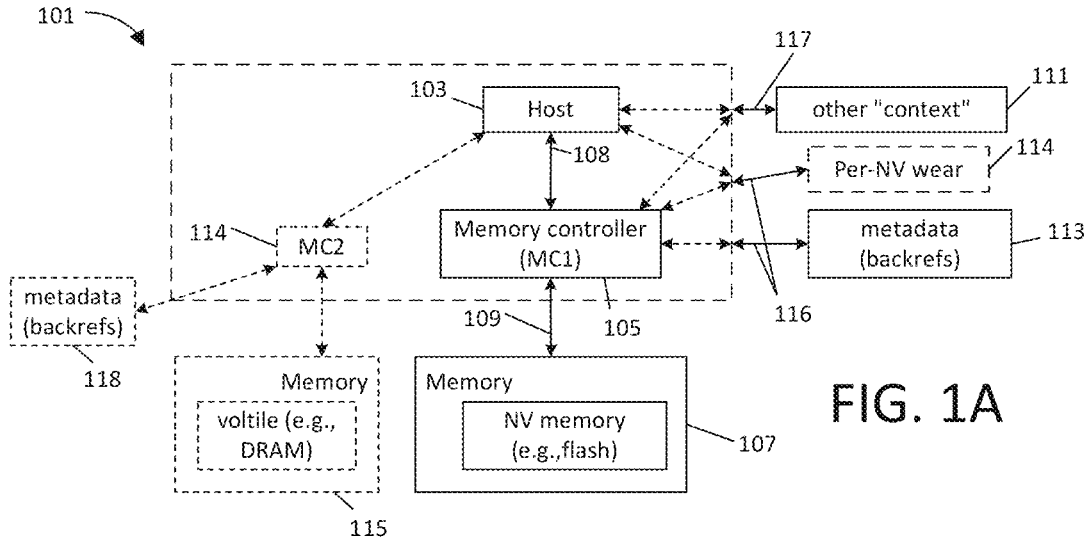
FIG. 1A shows a memory system having a host, one or more memory controllers and memory.

The subject matter defined by the enumerated claims may be better understood by referring to the following detailed description, which should be read in conjunction with the accompanying drawings. This description of one or more particular embodiments, set out below to enable one to build and use various implementations of the technology set forth by the claims, is not intended to limit the enumerated claims, but to exemplify their application to certain methods and devices. The description set out below exemplifies methods supporting the tracking of context information in a memory system, using back references or other "context information" written by a host together with data, for optional use in data migration. More specifically, storing sufficient context metadata together with underlying data permits a nonvolatile memory controller (e.g., as the need for maintenance arises) to provide stored "handles" for that underlying data to a host and thus update host file references and/or manage data migration (e.g., for wear leveling, garbage collection or other purposes) in a manner where destination address can be specifically selected in a manner planned for efficiency purposes. Such stored context metadata can potentially be used for other applications as well. Disclosed techniques can be practiced in one embodiment by a host, in another embodiment by a memory controller (e.g., within a single drive), and in a third embodiment by one or more hosts cooperating with one or more memory controllers. This disclosure also provides improved designs for a memory controller, a host, a memory system, a subsystem (such as a drive, e.g., a solid state drive or "SSD"), and numerous data management methods. The disclosed techniques can also be implemented in software or instructions for fabricating an integrated circuit (e.g., a circuit design file or field programmable gate array or "FPGA" configuration) or in the form of data arranged dependent on wear in non-transitory memory. While the specific examples are presented, particularly in the context of flash memory, the principles described herein may also be applied to other methods, devices and systems as well.

DETAILED DESCRIPTION

This disclosure provides techniques for storing information to identify "context" along with data in memory, for later provision to a host. As the host writes data into memory, information specifically selected by the host is also written into memory as metadata. As needed by the host, in order to understand context for data stored at a given, seemingly random physical memory location, the stored metadata for the data stored at that given physical memory location is retrieved by the memory controller and forwarded by the memory controller to the host. The stored "context metadata" can take a number of different forms depending on embodiment, e.g., in one embodiment, it can be a pointer to a table (e.g., a table of one or more back references); in another embodiment, it can be one or more back references written together with the data (e.g., a file name/path, object identifier/offset or key). In still another example, the context metadata provides a link to other metadata that permits the host to retrieve and/or identify characteristics associated with data found at the given physical memory location. Yet other examples of context metadata will be apparent from the examples below.

"Context" as used herein refers to any information that helps a host or memory controller better understand the characteristics or references associated with data stored at a given physical storage location (i.e., physical address). The metadata specifically stored by the host at the time of a data write comprises specific information selected in advance to provide a "handle" to identify characteristics of that data, for example, a back reference, a predefined link to a table, and so forth; this "context metadata" is typically static (i.e., decided upon by the host in advance), but it can be combined with, or used in concert with, other metadata that is dynamically updated or maintained by the host or memory controller (e.g., such as metadata relating to data read frequency, as one non-limiting example). Note as this example indicates that the context metadata stored by the host need not be, in every embodiment, a complete descriptor of context, i.e., embodiments are specifically contemplated where the stored context metadata provide a link to other metadata (e.g., a list of back references) stored at another location; for example, the stored context metadata can comprise a pointer selected by the host that identifies a specific location in a host-maintained table, where that host-maintained table provides context information. While generally static once written, in alternate embodiments, the "context" metadata can be dynamically updated without rewriting or otherwise modifying underlying data or the physical storage location corresponding to the "context" metadata.

As an example, context can be inferred using from metadata comprising one or more back references or an object identity (ID) with an offset to a location within the object (e.g., an inode object and an offset); this context metadata can be stored together with the data in question (e.g., as part of an extended page) or it can be stored separately, e.g., at the time of initially writing the data in question. As the host or a memory controller becomes involved with operations at a given physical storage location, the host or memory controller can be provided with the context metadata (e.g., back reference(s)) to gain insight into the nature of the LBA occupying that given physical storage location. For example, back references can permit a host to readily identify which pages, blocks, units, file types, applications, or clients "own" or are otherwise associate with a data found at the given physical storage location, without requiring the host to use extensive processor cycles to track down and identify the forward references associated with that data. In another contemplated implementation, a host writes a string of complete, field-delimited back references for each LBA at the time of each write of that LBA (i.e., such that the back references provide complete forward reference identification, permitting the host to immediately trace information from a given physical address back through multiple layers of indirection); when later provided with this information, the host can forward trace (and update) its forward references in order to more efficiently manage memory (e.g., using host-resident software processes); for example a moving agent can obtain a back reference and send this information to a file system layer, which can then update its data structures appropriately.

The stored context metadata can be used alone, as implied, or it can also be used with other information (e.g., second metadata) maintained by a host or memory controller. For example, such information can be used in planning an intelligent data move (i.e., to a destination location selected by the host dependent on characteristics implied to the data in question); the host can use the context metadata to identify client, file name and other particulars, and then use that information in selecting a physical destination (e.g., memory tier, memory type, virtual device, etc.) optimized for the underlying data. In a variation, the aggregate metadata can be used for wear leveling or for other storage optimization purposes, for example, by identifying context for data at a particular physical memory location, imputing characteristics to that data, and then matching that data to a memory location selected for performance or wear characteristics matched to that data. Other examples will be apparent from the discussion below.

The context metadata can be created with each new write of underlying data and stored by the host in manner easily retrieved when that data is accessed (for example, in the form of a page extension or logical address extension, as further described below for some embodiments). A relatively straightforward hypothetical example is provided by a host that is alerted that it must perform garbage collection on "page no. 23 in erase unit no. 134" in a flash memory device (see the patent application for "Cooperative Flash Memory Control," referenced above); the host might not inherently have any independent means of attributing significance to data identified by such a physical storage reference. However, by linking that physical memory location (i.e., having data that must be moved) to context metadata as described (e.g., back reference, object ID/offset, and so forth), the host can be provided with a means of updating its forward reference structures in a manner that permits it to more efficiently access that data. As noted, employed further in an application that plans/stores data in an optimized manner, the context metadata can further can further be used to select a new move destination for the data in question.

To cite a few examples, a host or memory controller can use back references or another stored identifier to identify information at respective physical memory locations as belonging to a specific file, client or application, and so, the host can consolidate or migrate LBAs on this basis to selected physical memory locations or tiers of memory. A host can also use the stored "context" metadata (e.g., in concert with other metadata characteristics tracked by the memory controller or host) to also understand the nature of data even within a given file or block of data (e.g., it can use both back references and data age to select a destination for a data move, either within or across storage devices or tiers). In another variation, a host can use the provided information to allocate or dynamically reconfigure memory, for example, to create virtual block devices, to reallocate space, or for other purposes; see, e.g., the discussion of virtual block devices found in the aforementioned utility patent application for "Expositive Flash Memory Control" which has been incorporated by reference.

As a further example, a memory controller might not inherently "know" which file a particular block of data belongs to but, with access to "write frequency" information (e.g., second metadata as referred to above), the host can consolidate that particular block of data with other data having a similar write frequency, or it can select a destination memory location to which the data can be moved which is especially suited to the perceived write frequency of the data in question; infrequently overwritten LBAs for example can be stored in flash memory or other storage media not amendable to excessive write frequency or write performance, while LBAs important for system performance or that are frequently overwritten or for which performance is key can be stored in dynamic random access memory ("DRAM"). Naturally, these principles can be extended to other memory tiers besides DRAM and flash. Even within a given memory tier (e.g., a single layer of flash memory), these techniques can be used, e.g., infrequently rewritten LBAs (or that represent data that is "cold" or "stale" or "old") can be moved to locations with high wear (and conversely, LBAs representing data that is "hot" or that is more frequently written can be cached or moved to locations with low wear, to provide for a form of wear leveling). Note that application of stored context metadata by a host to data migration and efficient memory space allocation is not required in all embodiments.

Various implementations are described below, generally, as a system, method, host, host software, memory controller, or as circuits, software, memory, and/or combinations of these things. Generally speaking, any functions and/or processes described herein can be implemented in one or more of these forms, for example, as a system, or circuitry in a memory controller or counterpart circuitry in a host for interacting with such a memory controller, and so forth. "Circuitry" can refer to dedicate logic gates, arranged so as to necessarily perform a certain function, or as general purpose circuitry (e.g., a processor, FPGA or other configurable circuits) that are controlled or configured by instructions to adapt that circuitry to perform a specific function. In the case of software or other instructional logic, the instructions are typically written or designed in a manner that has certain structure (architectural features) such that, when those instructions are ultimately executed, they cause the one or more general purpose circuits or hardware devices to necessarily perform certain described tasks. "Non-transitory machine-readable media" means any tangible (i.e., physical) storage medium, irrespective of how data on that medium is stored, including without limitation, random access memory, hard disk memory, optical memory, a floppy disk or CD, server storage, volatile memory, memory card and/or other tangible mechanisms where instructions may subsequently be retrieved by a machine. The machine-readable media can be in standalone form (e.g., a program disk, whether bootable or executable or otherwise) or embodied as part of a larger mechanism, for example, a laptop computer, portable or mobile device, server, data center, "blade" device, subsystem, electronics "card," storage device, network, or other set of one or more other forms of devices. The instructions can be implemented in different formats, for example, as metadata that when called is effective to invoke a certain action, as Java code or scripting, as code written in a specific programming language (e.g., as C++ code), as a processor-specific instruction set, or in some other form; the instructions can also be executed by the same processor or common circuits, or by different processors or circuits, depending on embodiment. For example, in one implementation, instructions on non-transitory machine-readable media can be executed by a single computer and, in other cases as noted, can be stored and/or executed on a distributed basis, e.g., using one or more servers, web clients, or application-specific devices, whether collocated or remote from each other. Each function mentioned in the disclosure or FIGS. can be implemented as part of a combined program or as a standalone module, either stored together on a single media expression (e.g., single floppy disk) or on multiple, separate storage devices. The same is also true for a circuit description for fabricating cores, processors, devices or circuits described herein, i.e., the result of creating a design can be stored in non-transitory machine-readable media for temporary or permanent use, either on the same machine or for use on one or more other machines; for example, a circuit description or software can be generated using a first machine, and then stored for another machine or manufacturing device, e.g., for download via the internet (or another network) or for manual transport (e.g., via a transport media such as a DVD) for use on yet another machine. Throughout this disclosure, various processes will be described, any of which can generally be implemented as instructional logic (instructions stored on non-transitory machine-readable media), as hardware logic, or as a combination of these things.

With general techniques provided by this disclosure thus introduced, this disclosure will now provide additional detail as to several specific embodiments.

FIG. 1A illustrates a first embodiment of a system, generally designated by reference numeral 101. The system can optionally be a homogeneous memory system, that is having a single tier of memory 107, or a heterogeneous system, that is, having more than one tier of memory, such as exemplified by NV memory 107 as a first tier and volatile memory 115 as a second, optional tier. A host 103 refers to one or more machines, circuits or devices from which memory access requests originate, for example, to store data (write), to retrieve data (read) and so forth. The host typically comprises at least one operating system and application software run on one or more computers, for example, portable devices, laptops, desktops, embedded machines, servers, clusters of machines, networks, or other sources of memory requests. Such requests are directed to a memory controller 105, which is charged with the management of memory 107 and the performance of tasks delegated by one or more host machines. For example, NAND flash memory is typically written using a series of "program-verify" (or "PV") cycles; the memory controller ("MC1") performs many specialized management tasks relating to maintaining such memory, tasks which can be transparent to the host. For example, a flash memory controller typically stores a page of data to be written to memory through the use of individual programming cycles (e.g., each using sets of voltage pulses) in an attempt to cause a page of memory cells (e.g., 128k memory cells) to adopt respective values corresponding to the data to be stored; such an operation can take time and is typically delegated by the host. For example, after a first programming part of each PV cycle, the memory controller (MC1) 105 reads results out of the just-written page of memory cells and compares this (e.g., exclusive-ORs this data) with the original write data, such that data stored in a "write buffer" is modified to represent only additional values which still need be changed relative to prior programming. Multiple buffers can be used to provide read/write concurrency, e.g., to permit servicing of reads to data that is currently the process of being written, by servicing those reads from duplicate data in a second buffer; multiple buffers can also be used to permit a second read/write operation to one memory location to be initiated concurrently with the unloading of data associated with a first read/write operation for a second memory location. After the "verify" part of each PV cycle, if necessary, the memory controller uses one or more ensuing PV cycles (often using a slightly higher voltage) until all memory cells for the page in question adopt the proper value and there remains no additional data to be written. In the case of this example, the host 103 might send a write command with write data to the memory controller (MC1) 105, via one or more links 108, and the memory controller 105 would (transparent to the host) manage the operations necessary to achieve proper programming in the memory 107, via link 109 which connects the memory controller 105 with the memory 107. Note that the memory controller 105 is typically housed in its own integrated circuit ("IC"), but this need not be the case for all embodiments. For example, in one embodiment, the memory controller 105 is embodied as a distributed set of circuits (e.g., as an application-specific hardware design). In another embodiment, the memory controller 105 can take the form of a field programmable gate array ("FPGA"). In yet another embodiment, the functions of the memory controller can be merged with functions of the host (e.g., these circuits can be copackaged, as indicated by the presence of a dashed-line box around both elements), for example, mounted together on a common board or in a common package or die. In yet another embodiment, these circuits can be collocated with memory (e.g., on the same board or card, as a system on a chip, or in some other manner), or one or more of them can be remote relative to the memory, for example, communicating across a local or wide area network ("LAN" or "WAN," respectively). The Internet is an example of a WAN.

As noted earlier, the memory controller 105 maintains metadata 113 that permits a host to identify or understand context for data found at any particular physical memory location; as indicated by FIG. 1, this metadata can optionally include one or more back references, an object ID and offset, or other links or identifiers that permit the host to trace one or more levels of indirection in order to identify context for data found at the particular physical memory location. When a need for a maintenance event arises, for example, to relocate data stored in flash memory (e.g., for wear leveling or other purposes), the memory controller provides the context metadata associated with a given physical storage location to the host. This information can also be provided responsive to explicit host query, with the memory controller (MC1) 105 architected to have query support logic (not shown in FIG. 1) for retrieving such metadata and responsively transmitting it to the host, with or without the actual data content stored at the associated memory location. The host can then optionally use this metadata to allocate memory (e.g., to establish, configure or reconfigure virtual block devices, as discussed further below), to move memory between tiers (e.g., to relocate data in DRAM from flash or vice-versa for performance considerations), or for other purposes. To this effect, the memory controller can also maintain per-physical location wear 114 as another form of metadata, which it can use to suggest appropriate destination locations for data that is to be relocated (e.g., for garbage collection or wear leveling); this physical location metadata can be stored together with, or separate from, metadata associated with write data (and by implication a given LBA), and the physical location metadata can also be supplied responsive to host command, for example, to suggest candidates for block (i.e., erase unit or "EU") erasure, as discussed in the U.S. Utility Patent Application for "Cooperative Flash Memory Control," referenced earlier. In alternate embodiments, the host can maintain wear metadata or other types of metadata for use in combination with "context" metadata provided by the memory controller; for example, the host can use the "context" metadata provided by the memory controller to load second metadata (e.g., stored by the host) that then provides a characterization for data found at a given physical memory location. As denoted by numeral 116, the various metadata maintained by the memory controller (MC1) can optionally be stored in separate memory, for example outside of the memory controller and outside of nonvolatile memory 107; this is not required for all embodiments. Note that the depicted system can optionally include more than one type of NV memory and it can optionally include other types of memory, such as volatile memory, for instance, dynamic random access memory ("DRAM"). Volatile memory is memory that requires application of power in order to preserve stored data; DRAM, in particular, is a type of inexpensive, very fast, reliable volatile memory in which data is stored in the form of a charge on a capacitor for each memory cell. Because this charge leaks over time, data must periodically be read out of a particular memory location and rewritten to that location in order to maintain the integrity of the stored data values; if power is lost, the data is typically lost as well. There are also many types of volatile memory other than DRAM. There are also many forms of NV memory; for example, some common forms of NV memory include without limitation flash memory, silicon-oxide-nitride-oxide-silicon (SONOS) memory, magnetic memory of various types (including hard disk drives), magnetic random access memory (MRAM), phase change random access memory (PCRAM), resistive random access memory (RRAM), shingle drive memory, nanowire memory, optical storage (such as compact disks, digital video disks or "DVDs," Bluray disks, and other forms), and other types of memory. For embodiments which continuously track (1) metadata for data found in physical memory locations (e.g., including one or more of host-stored "context" metadata and/or dynamically compiled metadata such as read or write frequency, etc.), as well as (2) metadata representing wear of NV physical memory locations (e.g., irrespective of whether data is currently stored there), such embodiments can advantageously track the former (1) for all data managed by the host or the memory controller irrespective of memory type (e.g., even if such is stored outside of non-volatile memory, e.g., in DRAM, etc., in a manner linked to current physical location), and the latter (2) just for certain NV memory types only for which such data is pertinent (e.g., such as flash memory). Such a scheme can be applied to a system with only one memory type (e.g., back references and LBA characteristics for pages of data stored in flash, for those physical storage locations holding such data, and for all physical storage locations, even in flash if no data is currently stored in those locations) or for complex memory types (e.g., back references and LBA characteristics tracked in every memory tier, such as for one or more types of volatile memory and/or NV memory, and physical wear tracked just for the NV memory). The context metadata and physical location metadata can be stored in any desired manner, for example, as a multi-entried table, as a set of diverse, stored values in disparate buffers or memory locations, on-board one or more host machines, on-board one or more memory controllers, or in memory itself. As this discussion implies, there can be more than one memory controller (and associated memory) per host. For example, in one embodiment, there can optionally be a second memory controller 114 with its own managed memory 115; this structure can be advantageous in some circumstances where very different maintenance operations are to be performed for different types of memory (e.g., a system having both DRAM and flash might have dedicated memory controllers for each, so that data access or maintenance operations in one memory tier are unaffected by data access or maintenance operations performed in the other). Note that, as indicated and as depicted by numeral 118, context metadata (including back references, as appropriate to the embodiment) is typically stored for this data as well. Many combinations are possible. Optionally, therefore, each memory controller can be used to manage a dedicated type or types of memory (e.g., a flash memory controller advantageously performs flash management tasks such as wear leveling and garbage collection for flash memory, while a DRAM memory controller performs DRAM management tasks such as refresh), but this need not be the case for all embodiments. That is, one memory controller (such as memory controller 105) can optionally be configured to collectively manage multiple types of memory, multiple integrated circuits, multiple dies or in some other combination. Finally, in some embodiments, the host and one or more memory controllers are structured in a manner such that they cooperate, exchanging information in a manner so as to efficiently manage data and/or memory. Detail pertinent to these variations will be further described below.

Figure 1B:
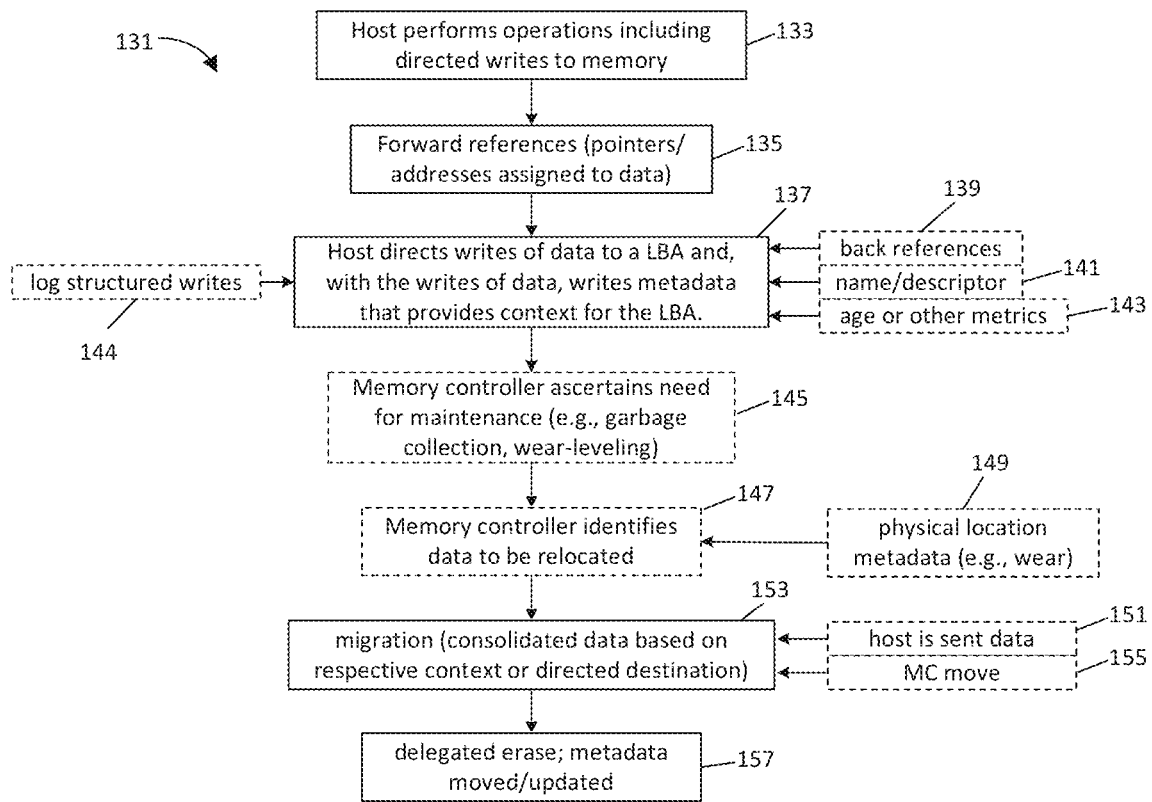
FIG. 1B is a flow diagram of a method of operation in a memory system.

FIG. 1B shows a method of operation in a memory system related to the principles just discussed. The method is generally designated by numeral 131 in FIG. 1B. More particularly, a host performs operations in memory including writes of data to one or more tiers of memory, as generally indicated by reference numeral 133. In the course of managing requests from various client machines or applications, the host may remap data for example from a file system through one or more levels of indirection, to arrive at a logical block address (LBA) used by the host to access specific data, cache updates to that data, and commit the data and the updates to main memory or specific storage drives. For each level of indirection, the host creates pointers used to find the location of needed data, i.e., forward references, per numeral 135. The host can also, depending on application, use a log-structured write system (144) that maintains checkpoints, caches data modifications, and performs updates at selected times to create new data writes. Flash memory and certain other memory types can further transparently map LBAs to offset physical memory locations, for example, according to a copy on write file system, to avoid bad blocks, for wear leveling purposes, etc. Per numeral 137, at the time that the host writes data (e.g., as part of a write command, or via an ensuing write command), the host commands the storage of metadata selected by the host to provide context for data written to memory for use when the host later needs to intervene or otherwise process ostensibly unknown data from physical memory locations, for example, in assisting with flash maintenance operations (such as garbage collection, wear leveling and other processes associated with data relocation). This context metadata can include back references 139 (e.g., the inverse of one or more of the forward references mentioned above), object identifiers and offsets, names or other descriptors 141 of files, tables or other information that can be used to identify to the host data at a seemingly random physical memory location, and other types of metadata 143, for example, that help characterize the data in question. To the extent that a memory controller (e.g., MC1 from FIG. 1A) maps a logical block address (LBA) to a physical memory location transparent to the host, the memory controller also maps the context metadata in a manner where that data is linked to the LBA at the remapped physical address location (e.g., the context metadata is stored in correspondence to the physical address location an can include reverse lookup information such as logical address, or otherwise implicitly or explicitly identify an LBA). For example, if the memory controller is of a type that uses address translation, the memory controller can store the associated metadata in a management table that has entries for each physical memory location where context metadata is stored and moved in association with specific LBAs stored at select physical memory locations; alternatively, the memory controller can also maintain a separate second metadata table indexed by LBA, with pointers from a physical location table into the second metadata table.

As noted by numeral 145, it is assumed that the memory controller at some point in time is to perform some type of data migration operation. Such could be the case, for example, in response to a garbage collection task performed to recycle used nonvolatile memory space (e.g., "released" but unerased flash memory), or where a process is attempting to realign memory space for efficiency purposes, for example, to reconfigure tiers of memory and data stored in those tiers, or virtual block devices defined within memory (this will be further described below). As part of such an operation, the memory controller, per numeral 147, identifies a particular physical location (e.g., a physical page holding unreleased data) and it interacts with the host to schedule a move, e.g., either transferring the data to the host (e.g., for move to the same or a different memory tier) or to migrate the data within the same memory managed by that memory controller via a delegated move operation. In the latter case, the memory controller will receive a specific destination information for the move which has been selected by the host in dependence on the provide metadata. Note that in either case, it is generally desired that the host have the capability of intelligently selecting a destination location for the move, but the host natively may not have information on hand that permits ready identification of the source data in question (i.e., it might not be able to intelligently select a destination without understanding the logical source of the data in question and context associated with that logical source). To address this, the memory controller uses its identification of the source physical memory location for the move to retrieve the context information (149) written by the host in association with the data resident at the source physical memory location; the memory controller provides this retrieved information (151) to the host for use in connection with the contemplated migration operation (153). The metadata, as noted, is deliberately selected and originally written so that it will permit the host to later identify/obtain context of the data stored at the physical address location, for example, using back references, file descriptors or links that permit the host to characterize (or identify other metadata characterizing) the physical address location's data. This metadata, including the metadata provided by the memory controller (and any other metadata, as appropriate to the embodiment) is use to identify context for data stored at the physical memory location, and the host uses the collective metadata to intelligently plan the migration, for example, selecting another tier of memory, consolidating various data together where such data has similar characteristics pertinent to memory system performance, moving data to a different block device within a given tier, restructuring data, block devices or memory organization, or moving data to a specific location where that data is matched to location wear. The host commands the move as appropriate, specifying in one embodiment specific destination where the data is to be sent as part of a delegate move within a given tier 155 (e.g., within flash memory). Per numeral 157, the host can then optionally command the memory controller to erase the old (stale) memory location by directing an erase of a specific (e.g., single) address or unit (e.g., an independently erasable unit in flash memory, or "EU"), and the movement and/or update of stored context information and other metadata, as appropriate.

Figure 1C:
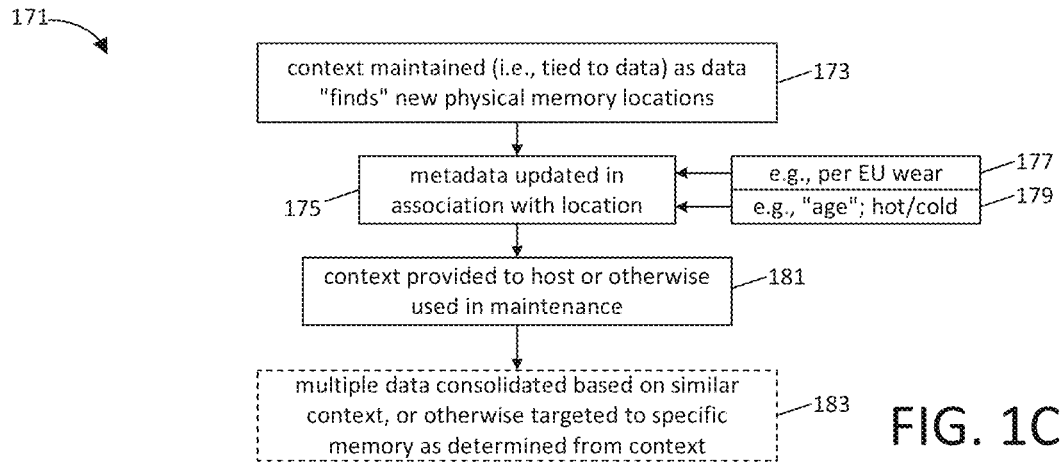
FIG. 1C is another flow diagram of a method of operation in a memory system, specifically, from the vantage point of a flash memory controller (or controller for other nonvolatile memory that is subject to lifecycle performance degradation).

FIG. 1C provides another flow diagram 171 that elaborates upon this process, specifically with regard to flash memory management (and other nonvolatile memory forms that experience lifecycle performance degradation). As data is migrated to a new memory location, the memory controller for the new memory location retrieves or is provided with the context metadata that is tied to the data that is being moved, and it stores this metadata in a manner tied to the new physical destination for that data (173). A memory controller for flash memory also stores/updates metadata that is associated with the physical memory location itself, such as the state of the memory cells (e.g., erase count or another measure of wear); in a case where data is being relocated within the same tier of memory, one memory controller will typically handle both tasks, but it is also possible for respective memory controllers (e.g., MC1 and MC2 form FIG. 1A) to handle the respective tasks. Note in this regard that the metadata for data context is advantageously maintained in association with data that is migrated from one memory location to another, i.e., the host and/or one or more memory controllers advantageously pass context metadata for relocated data in a manner that maintains the relationship between the metadata and the data to which it refers, and that changes association with physical memory location for that data, as appropriate; the context metadata can be also be copied from an old metadata record (and updated as necessary in association with a new physical memory destination), leaving the old metadata also in place to provide context for prior checkpoint until "stale" data (i.e., corresponding to the old metadata) is erased. By contrast, metadata associated with the physical memory location itself (such as wear metadata, bad block information, etc.) is typically stored only by "the" memory controller managing that physical location only. For example, whereas a flash memory controller will typically maintain per-EU wear and bad block status metadata in a manners strictly tied to the associated EU within flash memory managed by that controller (e.g., per numeral 177), context metadata related to a LBA which has been remapped to a specific physical page is moved or copied in a manner such that it "follows" the move of the LBA to the new physical destination (e.g., per 179). A given flash memory controller can maintain a metadata table indexed by physical location (e.g., see FIG. 6B, and the associated discussion below), with moves of context metadata to new table locations performed in order to mirror data moves, and a given flash memory controller can also be designed to maintain context metadata in a separate table indexed by LBA (see, e.g., FIG. 6C, and the associated discussion below), with pointers between physical and logical metadata tables as necessary. Whichever format is followed, when the flash memory controller identifies the need to relocate data or when it is explicitly queried by the host for context metadata matching a physical memory location or location range, it retrieves that metadata in question and provides that metadata to the host (181), for use in understanding the context of data stored at a corresponding physical memory location. Again, this information can be used by the host in consolidating different pieces of data based on similar content or in matching data having certain read/write characteristics to specific memory locations (e.g. having a specific wear state), per numeral 183. Other examples are also possible.

Figure 2:
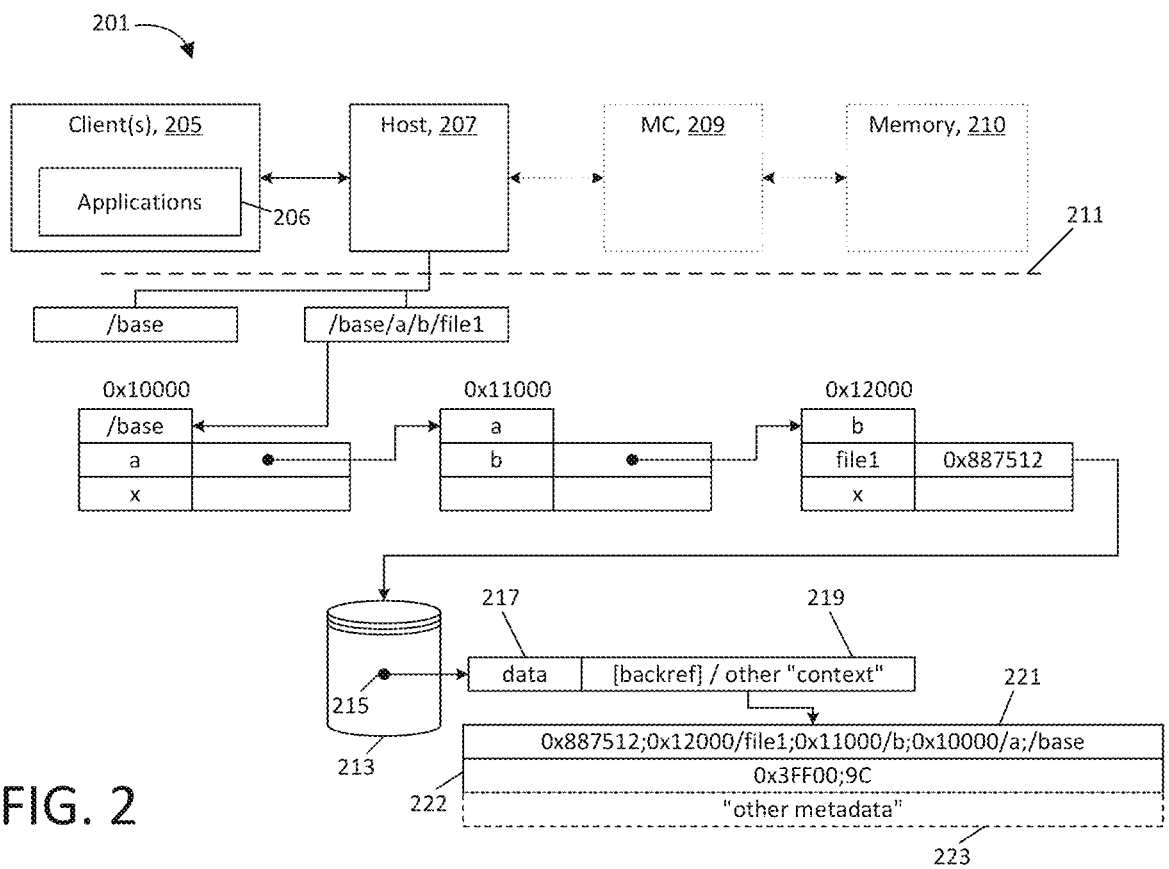
FIG. 2 is an illustrative diagram relating to the generation of back references that can be stored in association with writes of data into memory.

FIG. 2 is an illustrative diagram relating to the generation of back references that can be stored in association with writes of data into memory. More specifically, FIG. 2 illustrates an embodiment 201 having one or more clients 205, each having associated client applications 206, a host 207, at least one memory controller 209, and memory in the form of one or more arrays (210) managed by an associated controller. A horizontal separation line 211 is used to demark actions taken by the host in mapping data, for example, associated with one or more of the client applications 206, into memory 210. For this example, it should be assumed that the host is to store data as part of a file structure identified as "/base" and further that this file structure contains forward references "/base/a/b/file1" as illustrated in the FIG. More specifically, the forward references refer /base to /a, /a to b, /b to /file 1, each resulting in indirection to a specific logical block address; each such reference represents a different level of indirection associated with the storage of data. In a block-based storage system, forward references typically involve volume identification, followed by the traversal of the associated tree or other indexing structure that maps volume address to media address, to identify a physical block matching the volume block address of the user request. Whichever the case, be it i-node/file offset or volume/volume offset, this information provides context to the host to enable forward lookup.

As depicted in FIG. 2, the reference "/base" in this hypothetical could be stored at LBA which then might contain a pointer or forward reference to location /a at LBA 0x11000, which might contain a forward reference to LBA 0x12000, and from there to a location 0x887512 in a storage drive 213, this location being denoted by numeral 215 in FIG. 2. Note that in the case of storage drive comprising flash memory, a resident memory controller might further translate address 0x887512 into a physical location (the memory controller and associated translation would thus effectively be part of drive 213). From only the data (217) stored at this location, it would conventionally be difficult to understand which file the data belongs to, or for that matter, to identify context sufficient to plan intelligent storage of that data, or to reconfigure memory or otherwise perform migration for drive optimization purposes.

As discussed above, in embodiments discussed herein, context metadata is therefore specifically written by the host in association with data writes into memory so as to provide a reference for the host to later derive context for data found at a given physical memory location. For example as indicated by numeral 219, this metadata can include one or more back references or other data as desired to permit the host to ascribe characteristics to data residing at that physical memory location. In a relatively straightforward implementation, a back reference can consist of an identifier for an owner object and a logical or other offset within that object; for example, value having two numerical fields could be used to identify these quantities. Alternatively, the context information can include more detailed or sophisticated information that within its body provides "reverse mapping" for underlying data, such as logical address (LBA) and the inverse of any forward references that lead to data being at its current location. For example, FIG. 2 shows "0x887512;0 x12000/file1;0 x11000/b; 0x10000/a;/base" as an example of metadata that provides a string of field-delimited back references sufficient to identify each forward reference used by the host (for example, using other metadata 221 stored by the memory controller or the host). Clearly, many other (and potentially simpler) references can be instead used; numeral 222 for example refers to a two field entry comprising an address (e.g., "0x3FF00") and an offset (e.g., "9C"), which for example could respectively point to a table or file and an offset within that table or file. Other metadata 223 can include other types of information, for example, by way of non-limiting example, a file name or other descriptor or a link or identifier that permits the host to identify data characteristics, file type, or other information.

Figure 3A:
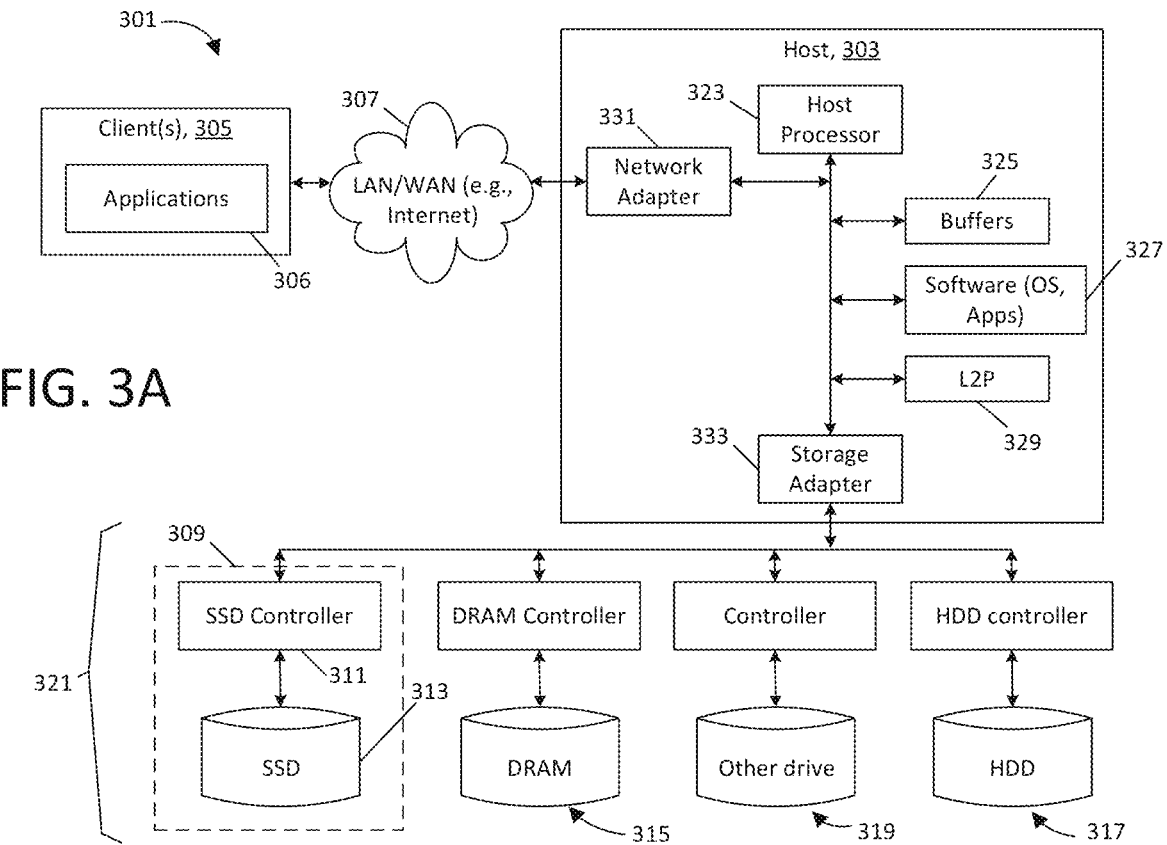
FIG. 3A shows the layout of a memory system having clients, a host, memory controllers, and storage drives.

FIG. 3A illustrates an embodiment of a memory system 301. This system is seen to be a heterogeneous memory system having multiple storage drives. In this example, a storage server receives requests for data or to store data and, optionally, requests for processing that data from one or more clients 305. These clients 305 once again each have respective applications 306 which generate the respective data-related needs. The clients can each be desktop or laptop computers, smart phones, pads or other devices, or other types of digital systems. The principles referenced above can be utilized in such a memory system for efficient management of files, and optionally for migration of data between tiers of memory (e.g., between memory tiers) in a manner that is intelligently planned.

More specifically, each client 305 sends requests to the storage server and receives responses via a wide area network, e.g., a local area network (LAN) or a wide area network (WAN) such as the Internet. The storage server, in turn, manages plural drives, each of which can be an SSD (e.g., a flash based drive), a HDD or another type of drive; in such an example, the storage server 303 (acting on behalf of the clients) represents the host 303, as indicated in the FIG.; it is also possible that the clients can act as hosts as well, e.g., via direct memory access if supported. As seen in FIG. 3A, each drive also has its own dedicated memory controller, either bundled together as a single assembly 309, or as separate devices; for example, assembly 309 is seen to include a SSD controller 311 and a SSD 313. To simplify FIG. 3A, a dashed-line box to discuss this relationship is shown only for assembly 309. The SSD controller 311 can be a NAND flash memory controller and the SSD 313 can have one or more NAND flash memory devices. FIG. 3A also shows optional presence of other dedicate assemblies, 315, 317 and 319, in this case seen to include a DRAM drive or card, an HDD and another unspecified type of memory, respectively. The collection of memory is seamlessly managed as a storage aggregate 321, with the storage server managing scheduling for all drives so as to avoid collisions with storage-server-directed reads and writes. In this regard, the storage aggregate and the host 303 are bundled together to form the storage server, but this is not required for all embodiments. The storage server has a storage operating system that implements a file system to organize the stored data as a hierarchical structure of logical data containers (e.g., volumes, logical units, directories and/or files) on electronic and/or magnetic storage media, as describe earlier. It will be understood by those skilled in the art that this description may apply to any type of special-purpose computer (e.g., file server or storage serving appliance) or general-purpose computer embodied as, or having, a storage server or portion thereof. The teachings of this description can be adapted to a variety of architectures including, but not limited to, a network-attached storage (NAS), storage area network (SAN), a disk assembly directly-attached to a client or host computer, or memory within a device (e.g., within a laptop or portable device), and FIG. 3A should be viewed as a proxy for such implementations.

The depicted storage server includes a host processor 323, which uses various buffers 325 under the auspices of the host software 327 to schedule and manage memory operations, including both memory transactions and memory maintenance operations. The host maintains a local translation tables and forward references so as to access files which can be fragmented in multiple memory locations and potentially multiple drives. The storage server also optionally employs policy-based space allocation, supporting data- and media-characteristic-aware data placement across the entire storage aggregate 321. The storage server communicates with the clients 305 via a network adapter 331 and with the storage aggregate 321 via a storage adapter 333 (although it is also possible to have all communications performed via network adapter or otherwise remotely over a network such as a WAN or LAN).

In some implementations, the client(s) can issue packets including file-based access protocols such as the Common Internet File System (CIFS) protocol or Network File System (NFS) protocol over TCP/IP when accessing information in the form of files. In other implementations, the client(s) can issue packets including block-based access protocols such as the Small Computer Systems Interface (SCSI) protocol encapsulated over TCP (iSCSI) and SCSI encapsulated over FC (FCP) when accessing information in the form of LUNs or blocks. Also in some implementations, the storage adapter includes input/output (IO) interface circuitry that couples to SSDs (319 and 315) and HDD (317) over an interconnect arrangement, such as a conventional high-performance Fibre Channel serial link topology.

In one implementation, the storage server is configured to access NAND flash memory, such as in drive 313 using physical block addressing, and to account for NAND flash memory-based device wear-out, and to execute garbage collection with associated valid data migration to manage NAND flash P/E asymmetry and other NAND flash management functions. The storage server can also configure virtual block devices within flash (and potentially other drives), and can allocate and optimize storage, on a dynamic basis if desired, as dictated by supporting software. The drive has a controller 309, as mentioned, which tracks physical location metadata for every host-accessible location that can be used to store data, regardless of whether currently active or stale data is stored at the corresponding memory location or not, and which also receives and stores "context" metadata as dictated by the storage server (note that the other depicted drives can also be designed to have "context" metadata support, e.g., to support dynamic remapping of LBAs between storage drives and hierarchies). In one embodiment, the stored physical location metadata includes wear data and bad block information as referenced earlier, as well as other state metadata such as EU erasure status and page usage/validity/release designators). This is to say, assemblies 309 advantageously has a cooperative memory controller that stores state information and other metadata and makes this information available to the host upon request (e.g., via command interchange) or automatically upon certain predetermined conditions. The storage server can cooperate with the storage server (i.e. the host) manage wear distribution across multiple drives to help lessen wear to any one area of memory; for example, in the context of the wear-aware writes, the storage server can collect wear metrics for all flash memory managed as well as for other types of nonvolatile memory, if present and if supported. The storage server can combine metadata from multiple drives and can allocate if desired new writes to a single drive only (and to a specific location within a single drive) if needed to better distribute wear or otherwise improve performance. As noted earlier, in one embodiment, the host can preferentially store relatively hot data (e.g., young or frequently rewritten data) in one drive (or in a part of a drive) and can store relatively cold data (e.g., old or infrequently rewritten data) in a different drive (or a different portion of the same drive) in order to better distribute wear or improve performance. In a second embodiment, the host can stripe hot and cold data (or other data based on individually-tracked metrics) across dies, devices or drives in order to improve performance. For example, if the depicted other drive 319 were a second SSD having flash memory, the host could allocate (within both flash drives, managed as a single tier) an equal distribution of hot and cold data destined for the flash tier in each drive; the same can also be performed within any given drive, e.g., SSD 313 might consist of multiple NAND flash chips, and the SSD controller 161 could perform this same striping entirely between integrated circuits within SSD 313).

Figure 3D:
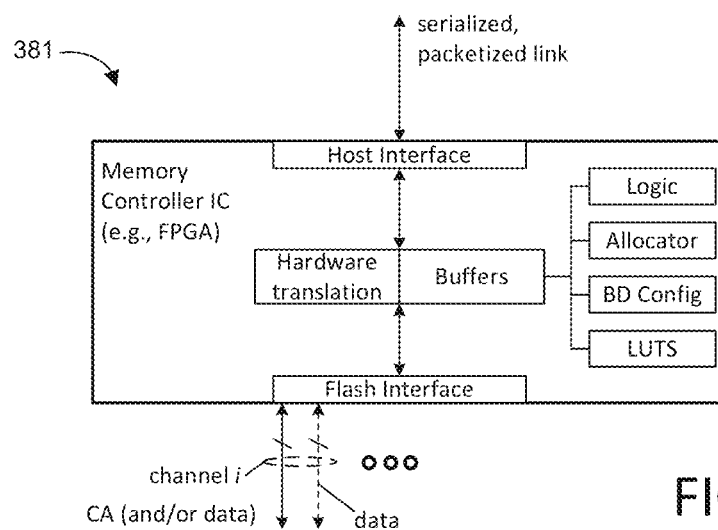
FIG. 3D shows a memory controller integrated circuit.
Figure 3B:
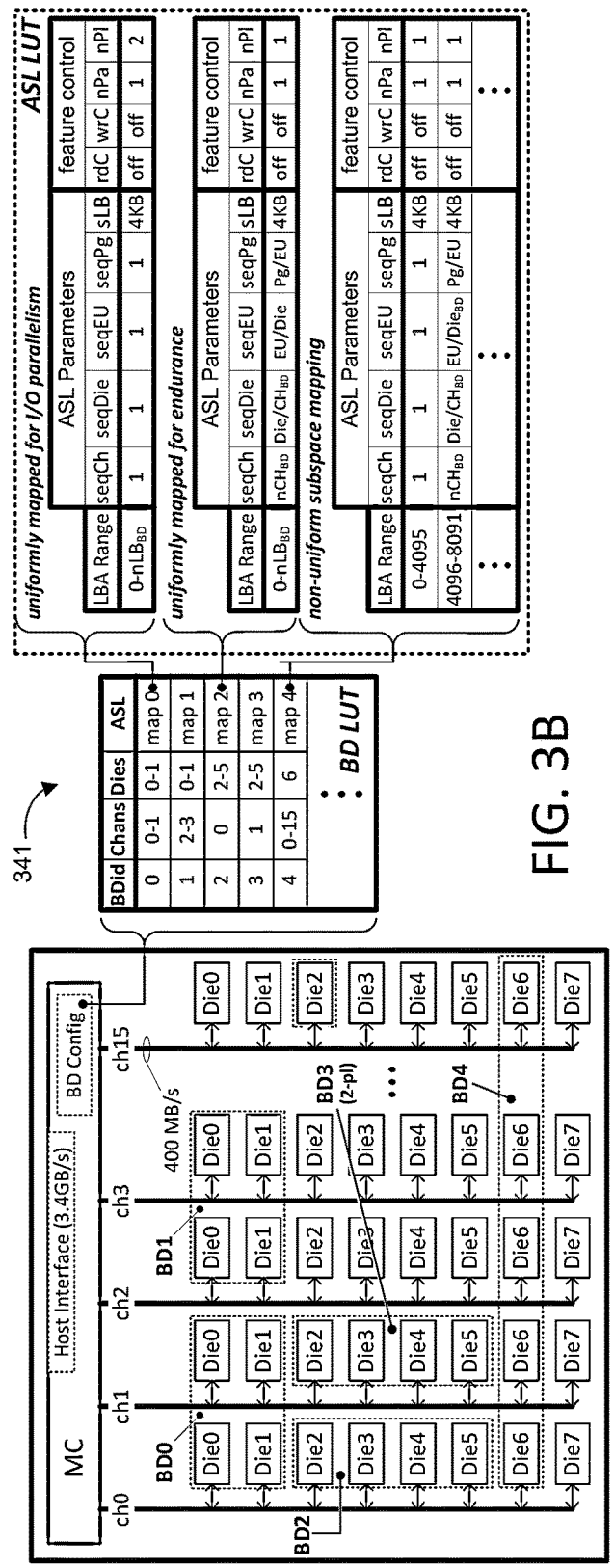
FIG. 3B shows a storage drive having a memory controller and sets of memory dies (Die0-Die7) arranged along respective channels (ch0-ch15); the depicted storage drive is configurable to selectively establish block devices (BD0-BD4).

FIG. 3B illustrates an exemplary (and not necessarily complete) block device allocation and configuration within a flash device, for example, for the SSD 313 from FIG. 3A. This scheme for block device allocation and configuration is generally referenced by numeral 341. As alluded to previously, in one embodiment, a memory controller virtualizes a solid state drive (e.g., composed of one or more NAND flash memory devices, having multiple channels, with respective dies coupled to each channel) to provide for configurable storage width and depth. Different virtual block devices can have different configurations. Depending on memory topology and on data storage needs, block device allocation logic within the memory controller or host (or the storage server from FIG. 3A) configures the memory controller so as to present multiple apparent devices to the host, with the memory controller performing "fast" address translation which remaps blocks of data at a specific level of hierarchy while preserving page and other LBA offsets within other hierarchical tiers of memory. For example, in one embodiment, the memory controller can be configured to preserve logical page order relative to EU boundaries, but can remap EUs worth of data to other EUs (e.g., to account for bad blocks, for wear leveling or other purposes). This can also be done at other hierarchical levels other than EU, as more fully described in the U.S. Utility Patent Application for Expositive Flash Memory Control, mentioned earlier. As more fully described in that application, such an architecture greatly simplifies the complexity of logical to physical (L2P) address translation, in some cases, permitted reduction of that function to a set of logic gates and lookup tables that provide for intra-clock cycle response to presented logical addresses. Note that, as per the data migration techniques and options described earlier, and in the copending U.S. Utility patent application Ser. No. 14/848,273 for "Techniques for Data Migration Based On Per-Data Metrics and Memory Degradation" referenced earlier, "context" can be used to better align data for performance other considerations, in some cases resulting in data moved between tiers of memory, and in other cases, in moving data between block devices.

As shown in FIG. 3B, five block devices, BD0-BD4 are allocated within a SSD, with each block device being constituted by one or more flash dies that are collectively associated with one or more memory channels (i.e., in this example, the smallest allocable block device is a single flash device). The block device configuration storage (BD Config) includes a block device lookup table (BD LUT) that is indexed by a block device identifier (BDid which may be, for example, a namespace or other handle or identifier) and holds, for example and without limitation, a specification of the one or more channels spanned by the block device (i.e., "constituent channels") and the one or more dies on the constituent channels. For instance, block device 0 (BD0) spans channels 0 and 1, and includes dies 0 and 1 on the constituent channels and thus includes four flash dies in all. Block device 1 is similarly defined as encompassing a 2 x2 set of flash dies, but spans channels 2 and 3 instead of 0 and 1 and thus forms an entirely discrete storage area (i.e., no physical overlap) with respect to block device 0. Block device 2 spans a single channel (channel 0) and flash dies 2-5 on that channel, and thus also constitutes a four-die block device, but without the channel parallelism of block devices 0 and 1 (i.e., a 1×4 block device instead of a 2×2 block device). Block device 3 is also a four-die 1×4 block device, but is constituted by allocation of dies 2-5 on channel 1 instead of channel 0. Lastly, block device 4 is a 16-die block device that includes a single die (die 6) all 16 channels—that is, a 16×1 block device. Thus, of the overall set of five allocated block devices, four block devices (BD0-BD3) include discrete sets of four constituent dies and thus have a 32 GB pseudo-physical storage capacity (i.e., each die includes a pseudo physical count of 2048 erase units, each containing 256 16 KB pages and thus $2^{11}*2^8*2^{14}$ bytes or 8 GB) and the fifth block device (BD4) includes a discrete set of sixteen dies and thus a 128 GB pseudo physical storage capacity. Also, in this particular example, the channel and die identifiers recorded within the block device lookup table correspond one-for-one with underlying physical channels and dies within the flash device as neither of those elements of the structural hierarchy are virtualized. In alternative embodiments or configurations of the flash device, either or both of those elements may be virtualized.

Continuing with FIG. 3B, each entry within the block device lookup table additionally includes an index to a respective set of one or more entries within an address space layout (ASL) lookup table (LUT), with each ASL LUT entry including ASL parameterizations and feature control settings for the complete or partial LBA range of the corresponding block device. In the particular example shown, ASL/feature-control parameter settings for three different block devices are illustrated, including a uniform ASL/feature-control parameterization within block device 0 (i.e., parameterization applies uniformly to the entire LBA range of the block device—there are no subspace definitions), another uniform ASL/feature-control parameterization with block device 2, and another multi-subspace ASL/feature-control parameterization within block device 4, with separate ASLs defined for each of multiple LBA ranges within the block device, only two of which are shown. Entries for block devices 1 and 3 are also present in the ASL lookup table, but not specifically shown in FIG. 3B.

As discussed above, the ASL parameters define the manner in which sequential LBAs are distributed within the structural hierarchy of the block device and thus indicate the number of pages within the same erase unit (i.e., "seqPg") to which sequential LBAs apply before progressing to page(s) in the next erase unit, and then the number of erase units to be sequentially accessed within a given die ("seqEU") before progressing to the next die, and then the number of dies to be accessed on a given channel ("seqDie") before progressing to the next channel. The feature control parameters include, for example and without limitation, whether read caching and write caching are to be enabled (independently settable via the rdC and wrC fields of the ASL lookup table entry) for the block device or subspace thereof, the number of pages that may be simultaneously or concurrently written to or read from within the same erase unit (nPa), and the number of erase-unit planes to be concurrently accessed in a given write or read command sequence (nPl). For simplicity of understanding, page caching in both the read and write directions is disabled (i.e., "off") within the exemplary ASL lookup table entries shown. Multi-page operation (i.e., nPA set to a value greater than one) and multi-plane operation (nPl set to a value greater than 1) likewise raise the minimum data transfer size between the host and memory controller. In the specific examples shown in the ASL lookup table of FIG. 3B, multi-page operation is disabled at least within block devices 0, 2 and 4, and multi-plane operation is disabled at least within block devices 2 and 4. By contrast, dual-plane operation (nPl=2) is specified for block device thus doubling the number of concurrently written pages (a block device characteristic referred to herein as a "stripe size" or "frontier width") as compared to a physically-comparable block device (e.g., block device 1) configured for single-plane operation.

Still referring to FIG. 3B, the singular values ('1') recorded for the LBA-sequencing ASL parameters within the ASL lookup table entry for block device 0 dictate that LBAs are to be distributed widely through the structural hierarchy of the flash device with, for example, each page of a sequentially addressed set of four pages (and thus a sequential range of 16 LBAs given the sLB=4 KB logical block size setting) being read or written within a different one of the four constituent dies of the block device, thus effecting 4× ("multiplied-by-four") parallelism in the page read or write operation and thus approximately a 4× bandwidth increase over a configuration that directs four sequential page read or write accesses to the same erase unit within a given die. In actuality, the dual plane setting within block device 0 doubles the number of concurrently accessed pages within each of the four constituent flash memory dies of block device 0, thus establishing an 8-page stripe size and thus read and write bandwidths that are approximately eight times the baseline single page read and write bandwidths of a given flash die. By contrast, block device 1 which otherwise constitutes the same 2 x2 die-layout as block device 0, is configured with a deep (rather than wide) address space layout and with only single-plane access throughout its LBA range. Thus, pages falling within a sequential LBA range of block device 1 are mapped to physical pages within an erase unit until the end of that erase unit is reached (i.e., "Pg/EU"), with the LBA range thereafter continuing through the physical pages of a next erase unit and then the next until the final erase unit (EU/Die) within the die has been traversed, with the LBA range thereafter continuing through the pages and erase units of the next die on the same channel before carrying over to EUs and dies on an adjacent channel. In general because the stripe size is very narrow (i.e., a single page and thus as narrow as possible in the exemplary flash memory die shown), only a single erase unit is impacted by each page write operation and thus, despite the relatively low write bandwidth (i.e., 16 KB/$t_{PROG}$ in contrast to the 8*16 KB/$t_{PROG}$ bandwidth achieved by the 8× wider stripe size in block device write-induced wear resulting from, for example, storage of a 16 MB host segment, will occur in only a relatively small number of erase units and dies—four 4 MB erase units within the same die in this example—in contrast to the storage of each of the 1024 16 KB pages within a respective one of the 1024 erase units of block device 0 (i.e., each of the 256 erase units within each of the four dies is written to and thus worn to some degree). Conceptually, while the total page wear is equivalent in both block die configurations (the same number of pages is written), the wear within narrower-stripe-size (i.e., deeper, but lower bandwidth) block device 1 is concentrated within a much smaller number dies (and potentially erase units as well), simplifying wear-leveling operations and thus raising endurance of the block device as compared to wider, higher-bandwidth block device 0. In general, all these considerations are made available to the user/system designer in configuring the block devices, as the designer is able to directly, or with the aid of the block device allocator, specify ASL and feature-control parameters that strike a design balance between endurance and bandwidth requirements of a given application, potentially configuring block devices having widely varying performance characteristics within the same flash memory device, as illustrated by block devices 0-4 in FIG. 3B.

Concluding with FIG. 3B, the ASL lookup table includes multiple entries (and thus multiple subspace definitions) for block device 4, with an initial entry specifying a 4K LBA range (0-4095) mapped for high I/O bandwidth (i.e., 16-page stripe size as the write frontier spans all sixteen of the flash dies within the block device) and another entry specifying a subsequent 4K LBA range mapped for endurance (single-page stripe size). One or more other subspace definitions (not shown) complete the LBA range mapping of block device 4.

These entries can be used by a memory controller (and by the host) to plan, reconfigure and optimize the storage of data in memory in accordance with the principles discussed thus far. For example, as the host cooperates with a memory controller to perform data migration for optimization reasons, the host can assess the configuration of overall memory and can direct writes to specific locations and/or call for the re-optimization (and reallocation) of memory as necessary. For example, from context information, the host can elect to remap specific data to a different block device, to consolidate the data in-question with other data having similar use characteristics (data characterization), or to fragment data having dissimilar use characteristics. Using statistical or other processes, the host can examine whether current drive allocation or overall memory allocation is optimal and, if not, it can change the configuration of virtual block devices in a manner geared to better performance. Context metadata, as presented to the host, can thus be used not only for targeted writes (e.g., across memory tiers, between block devices, or within a given block device), but it can also be used to help the host assess current efficiency of memory layout and/or plan and/or dynamically reconfigure memory layout.

Figure 3C:
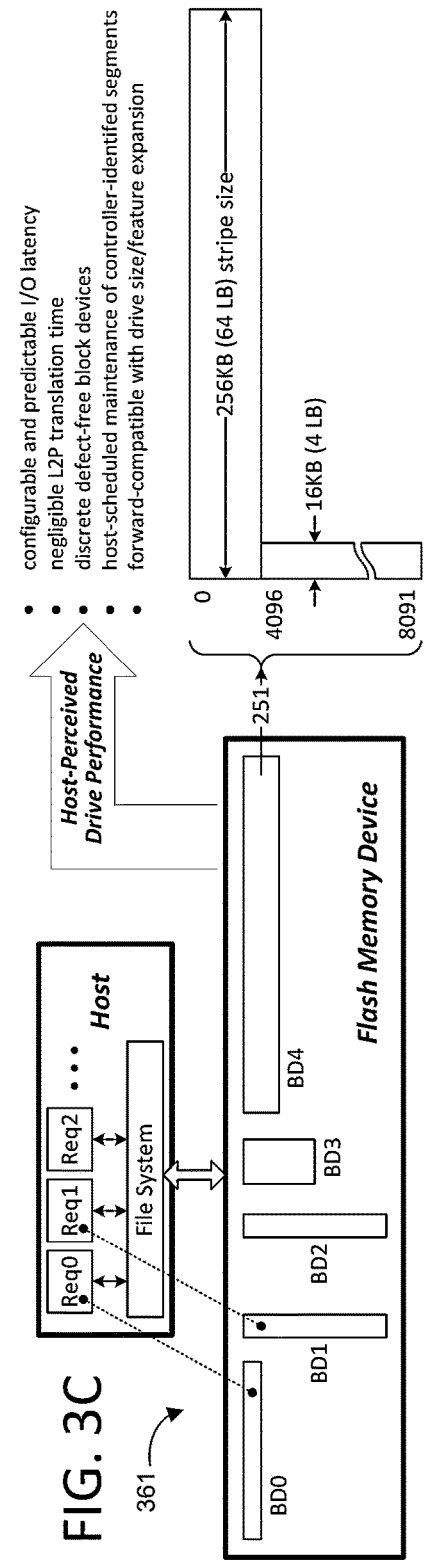
FIG. 3C provides another illustration of the storage drive of FIG. 3B.

Continuing with this example, FIG. 3C illustrates a host perspective of the exemplary block device allocations and configurations presented in FIG. 3B, showing relative block device capacities by the area/footprint of the block devices (as will be the case within the physical flash storage media) and illustrating relative block device bandwidths according to block device width (left-to-right across the drawing figure). This perspective is generally designated by numeral 361. As shown, block devices 0-3 all have the same four-die, 32 GB capacity and thus have the same footprint (i.e., spanning an equivalent area within the FIG.), while block device 4, encompassing four times as many flash dies as each of the other block devices has a correspondingly larger 128 GB capacity. Also, block devices 0, 1, 2, 3 and 4 are depicted with respective widths according to their nominal maximum I/O bandwidths of 8×, 1×, 1×, 2× and 16×, respectively, where each non-unity multiplier scales the baseline read and write bandwidths (i.e., 1-page/$t_{READ}$ and 1-page/$t_{PROG}$). As shown in detail view 251, the signaling bandwidth of block device 4 varies according to subspace, having a high (16×) bandwidth in the initial LBA range, and a 1× bandwidth in the LBA range that follows (i.e., in accordance with the respective subspace stripe sizes of 256 KB and 16 KB). Note also that actual block device bandwidths may be constrained by peak channel and/or host interface signaling rates, particularly in the case of memory read operations. For example, because the host interface is shared between all block devices (at least in the single host-interface embodiment shown in FIGS. 3B and 3C) and individual access channels may be shared by as many as eight block devices (or more or fewer according to the number of flash dies per channel), operations executed in one block device may cut into the signaling bandwidth needed for peak-rate operation within another block device, particularly where numerous high-bandwidth block devices share the same signaling access channel or a large number of block devices are allocated within the flash device (which may saturate the host interface during occasional concurrent read access within a threshold number of block devices).

FIG. 3C also presents a non-exhaustive list of flash device performance characteristics and features enabled by hierarchical address virtualization within the memory controller and configurable block device allocation, including (i) a configurable and predictable I/O latency, (ii) brief or otherwise negligible logical-to-physical ("L2P") address translation time (or at least dramatically reduced L2P time relative to operating modes that invoke a flash translation layer), (iii) allocation of discrete defect-free block devices in user-specified quantities and capacities, (iv) host-scheduled maintenance of flash-device-identified segments (or other logical units of storage), and (v) forward compatibility/ease of migration as flash device capacities and feature sets expand in successive device generations. As noted earlier, such an architecture also provides a scheme whereby address translation can be optionally implemented on an intra-clock cycle basis using configurable circuitry (logic gates and LUTs), thereby saving valuable and time-consuming processor cycles.

FIG. 3D shows an exemplary layout of a memory controller integrated circuit (IC). As noted by the FIG., in one version, such an IC can be implemented as a field-programmable gate array (FPGA) having logic gates and lookup tables (e.g., circuitry) configured to provide fast address translation as discussed above; this is not required for all embodiments, and in other contemplated embodiments, a memory controller can be implemented as a special purpose processor or other preconfigured integrated circuit, with or without the use of support software (e.g., firmware). As depicted by the figure, the IC includes a host interface, which for example, uses a standard communication interface framework (e.g., non-volatile memory express, or NVME or Serial ATA) for packetized communications, where packets comprise commands, address and data, as appropriate; note that this interface can be shared for commands directed to different channels or devices, i.e., the commands and data to respective channels and/or dies are typically MUX'ed over this channel for exchange between the memory controller IC and the host. The depicted memory controller features a flash interface, whereby one or more channels are used to communication with one or more memory devices. Each channel can consist of a set of links for address and/or data (e.g., for packetized communication of address and data over a set of eight links), or can feature separated address and databusses (as depicted by the optional, dashed-line links designated for "data"). The memory controller IC also features hardware translation circuitry as mentioned (e.g., with ASL parameters being used to configure address wrapping and distinction between hierarchical levels and with LUTs used for address mapping at selected or predetermined levels of the hierarchy) and buffers for buffering commands and/or data transfer as appropriate. In addition, the memory controller IC in this embodiment can include supervisory logic (e.g., for responding to host queries, performing LUT updates, and configuring parameters as appropriate, as well as for controlling sequencing and maintenance operations in memory), a block-device designer and allocator section as discussed earlier, and block device configuration elements, as appropriate. In one embodiment, some or all of these functions can be implemented in the form of instructions stored on non-transitory machine-readable media (e.g., firmware or software, for controlling one or more cores or processors).

In one embodiment, the techniques described above can be applied to track context metadata for each LBA and to store that context metadata in a manner organized by block device (BD) configuration, for example, with an entry for each physical address to which an LBA can be mapped, in any block device. For example, returning briefly to FIG. 3C, with reference to block device 4 (BD4), for configurations where the block device is shallow but wide, there can optionally be one context entry per row (e.g., context information for a strip of data spanning all sixteen channels). This configuration is not required in all embodiments. In addition, context can be used to merge data and/or move data to other block devices and/or tiers of memory. For example, if a cooperative memory controller is to perform garbage collection and alerts a host that an "active" page is still in use in an EU and must be moved prior to erasure of an EU, the host can use this information to determine (as a non-limiting example) that the active page in question is part of a larger block that has become fragmented due to a copy on write file system; the host can elect to rewrite the "active" page as part of a larger set of data, written across a stripe of data in a wider but shallower memory tier, such as BD4 from FIG. 3C. Conversely, data migration can also be performed to fragment data and for example, to relocate pages forming a relatively small subset of a "stripe" of data into a narrower but deeper block device, such as BD1 from FIG. 3C, for example, because the host determines that data in a common logical block in fact represents different data segments with diverse access characteristics. To this end, in some embodiments, metadata (and back references) is tracked for each page in a block device; in other embodiments, metadata can be consolidated (as data is migrated between different block devices or different tiers) to represent larger sets of aggregated data or conversely smaller sets of pages of data that have been moved to narrower-width devices.

Note also that there exist many different methodologies for storing metadata, including context metadata, for use or later provision to a host. FIGS. 4A-4D illustrate a number of different configurations.

Figure 4A:
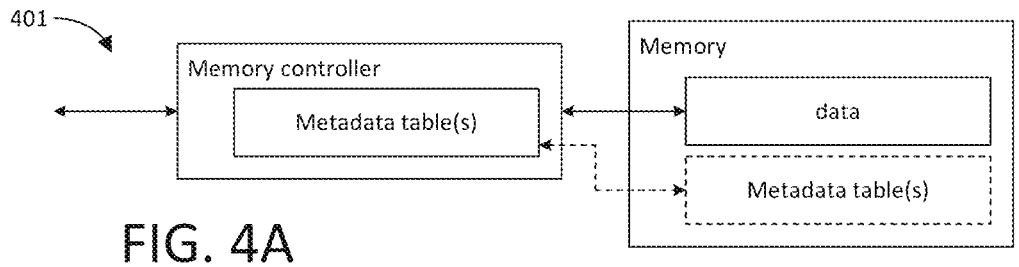
FIG. 4A is an illustrative diagram showing a memory controller and memory.

In the configuration presented by FIG. 4A, a memory controller stores one or more metadata tables for use in tracking context for LBAs stored in various locations in memory, with the locations being drawn from one or more arrays. In one embodiment, the memory controller maintains a single table, having an entry for each discrete, host-accessible physical memory location. For example, if memory managed by this memory controller was NAND flash memory and consisted of 1132 erase units each with 256 pages, the memory controller might maintain a table with 1132*256 entries, each corresponding to a physical page of cells; the memory controller can store any desired information in this table, as pertinent to the particular embodiment, for example, including back references or other file or data identifiers as has previously been discussed. As the need for a management condition arises—for example, the need to relocate data in a physical page where the physical page is the last active page in an EU and consequently must be moved in order to erase the EU and renew its use for other data—the memory controller accesses the metadata which is linked to the "active" physical page, and hence obtains back references (and/or potentially other metadata) that can be provided to the host for purposes of migration planning. Note that this operation does not, strictly speaking, require that the data to be moved in fact be provided to the host. For example, an exemplary sequence can consist of the following operations: (A) Host commands memory controller to identify EU with the greatest number of released pages and/or the fewest active pages; (B) Memory controller identifies specific a EU to host, providing the host with an address for that EU; (C) Host queries memory controller to identify each remaining active page in the specified EU to the host; (D) Memory controller responds with a sequence of messages, including an identifier of the number of active pages, followed by (for each active page), LBA/LBN (logical block number) and the back references (or other metadata) originally written by the host in a manner tied to that LBA/LBN and an escape character to indicate end of sequence; (E) Host uses this "context" to identify the object and respective logical pages within that object that the data stored in these "active" physical pages "belongs to," ascribe characteristics to the data, identifies new destinations (e.g., block device, channel, die, plane, etc.) for the activate pages to be moved, and responsively transmits one or more move commands to the memory controller that (directly) specify the destination locations (e.g., delegated move commands); (F) the memory controller receives the commands and moves data associated with LBAs to the destinations specified by the commands (i.e., together with moves as appropriate of any metadata corresponding to moved LBAs from the source "active" physical pages, so as to preserve links between the LBA at the metadata in a manner tied to the new physical destination); (G) steps (E)-(F) are repeated until each active page has been moved per host command for each EU of interest; and (H) the host then commands explicit erase of each associated EU by commands that explicitly specify the individual EU(s) to be erased, i.e., that identify specific EU address within a given array.

Reflecting on this operation, note in this example that the host selects a specific move destination for each page (i.e., in a manner dependent on context or other metadata for the LBA being moved, that the active pages of data are not actually sent to the host (but rather only metadata) and that the host explicitly commands erase of an individual EU; this operation should be contrasted with conventional architectures where erase is performed over a series of EUs by a memory controller (e.g., over an entire physical array or volume, as part of garbage collection, in a manner where the memory controller and supported memory might be offline in a manner that is transparent to the host and thus can collide with host needs for data access). As this statement implies, an erase of a single, specific EU does not necessarily collide with host accesses to other memory locations managed by the memory controller and, because the host initiates the move command and the destination, the host can queue/schedule the move and erase command so as to be threaded with other host access or maintenance requests, or otherwise so as to not collide with upcoming operations or operations already in progress. As implied by FIG. 4A, the one or more metadata tables can be directly stored within the memory controller, or they can be written to memory for selective access by the memory controller (as indicated by phantom lines in FIG. 4A). In other embodiments, the memory controller can use context itself to move data transparently to the host (e.g., for example, memory controller hardware or software logic examines metadata to consolidate data together or to perform delegated wear leveling and associated garbage collection, or hot/cold data or performance-based relocation as more fully described in the various patent applications which have been incorporated by reference). In embodiments where data migration is performed to match data having certain characteristics to specific locations within flash memory (see, e.g., "Techniques for Data Migration Based On Per-Data Metrics and Memory Degradation," referenced earlier), the memory controller can optionally maintain metadata tables respectively indexed by physical memory location (e.g., to store state information for the associated memory location, such as erase count or other wear metrics, as exemplified by FIG. 6B) and by LBA (e.g., as exemplified by FIG. 6C).

Figure 4B:
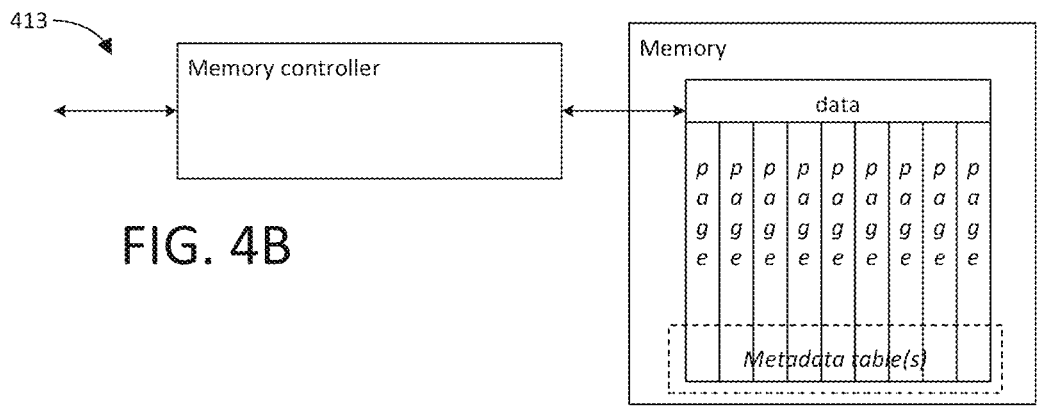
FIG. 4B is an illustrative diagram showing a memory controller and memory.
Figure 4C:
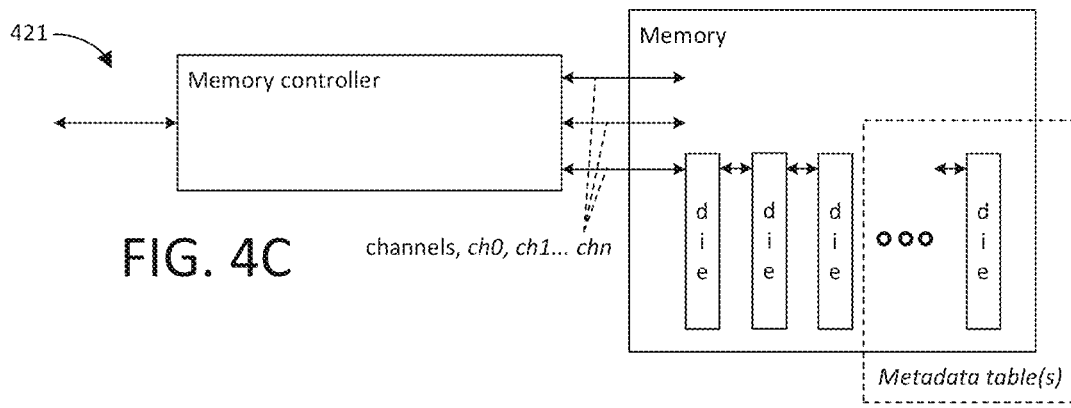
FIG. 4C is an illustrative diagram showing a memory controller and memory.
Figure 4D:
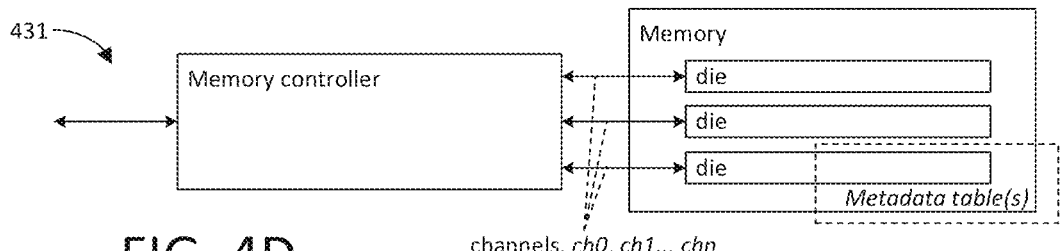
FIG. 4D shows metadata tables as occupying a portion of a die on a specific channel only.

As noted, a number of different methods exist for storing metadata in a manner such that the metadata can be accessed by a memory controller. One method, referenced by FIG. 4A, involves storing the metadata in one or more dedicated tables, for example, stored in the flash memory managed by the memory controller or in a completely separate memory. Another embodiment is represented by numeral 413 in FIG. 4B, where it is seen that memory is stored by the memory controller as lower or higher order data as part of an extended page (or other hierarchical unit), for each such unit stored in memory. For example, metadata can be added directly to the data, or separately stored by the host and added (or updated) by the memory controller in much as might be performed by some error checking and correct (ECC) schemes. Such a scheme can be implemented by a host or a memory controller as desired for the particular application. For example, in one version of this scheme, the host can simply structure each page so that metadata (e.g., part or all of a back reference as taught earlier, or a pointer) is within the confines of the page. In another version, a memory space page size of e.g., 56k bits, is advertised to the host, but data is stored in a larger physical page (e.g., 64k bits), with the memory controller transparently using a predetermined portion of each page to store metadata as commanded by the host, and with the memory controller transparently positioning metadata to be written for an LBA within the page extension confines. Such a configuration is generically represented in FIG. 4B by a striping of a metadata table across pages in a memory array. Note that for an extended page implementation where the memory controller transparently stores data in extended space, a configurable (hardware) address translation scheme can be used in much the same manner as used to translate logical addresses to physical addresses, e.g., with a hardware logic being configured by a block allocator as to number of EUs per plane, planes per die, dies per channel, and channels, and any appropriate extended page offsets to automatically write metadata to specific memory locations determine in association with a write request for data associated with a particular LBA. See, e.g., FIGS. 7-8 of the patent application for Expositive Flash Memory Control, referenced earlier, and supporting specification discussion. Note that while FIG. 4B illustrates an extended page configuration, the same technique can be applied to any level of hierarchy. This is in part seen in FIG. 4C in a scheme 423 where a die on each channel (e.g., the last die on the channel) is reserved for storing metadata. Note that such storage can be transparent to the host, e.g., which simply commands the memory controller to store metadata and specifies a LBA for the underlying data, with the memory controller then storing the metadata in reserved space used for this purpose. Again, the ASL mapping circuitry referenced above (as additionally described in the copending application for "Expositive Flash Memory Control") can be adapted for this purpose, for example, mapping metadata to reserved (e.g., extended) space that corresponds to data address space. As depicted by numeral 431 in FIG. 4D, it is not required that metadata storage be striped or for that matter have any special delineation outside of the memory controller; to that effect, FIG. 4D shows metadata tables as occupying a portion of a die on a specific channel only. Clearly, many alternatives are possible.

Figure 5A:
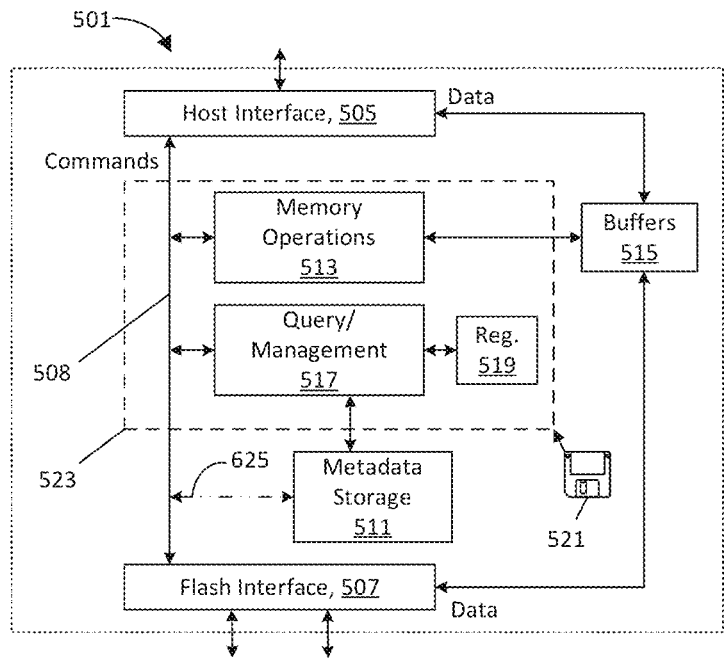
FIG. 5A shows a block diagram of a cooperative memory controller.

FIG. 5A helps illustrate layout of a cooperative memory controller, with an emphasis on query support, command processing and metadata management. In particular, a flash memory controller can be implemented as a single integrated circuit 501. As before, a host interface 505 is used to exchange commands and data with a host, and a flash interface 507 is used to issue commands to and exchange data with one or more flash memory devices (not shown in FIG. 5A). Note that in this embodiment, a single path is illustrated as coupling the memory controller with the host, for packetized exchange of both commands and data; that is, the host interface can include logic that extracts commands and data from request packets, and can also packetize read data, alerts, metadata and other communications to the host. Other implementations are also possible, for example, using separated command and data busses. In the scheme depicted in FIG. 5A, it should be assumed that the host interface has a high speed serdes interface, such that communications with the host occur over one or more differential signaling paths, for example, compliant with a PCIe, SATA or other signaling scheme. Note that one or more flash devices can be copackaged with the memory controller, and thus the flash interface 507 does not necessarily have to use the same signaling scheme as the host interface, e.g., communications can be via wide-bus single-ended communications, using command and data busses.

The host interface 505 separates controller commands from any received packets (as necessary), and routes these commands over a command bus 508 internal to the flash memory controller. Generally speaking, commands will relate to memory operations (e.g., reading or writing of data) or to queries for data and memory management functions. To this effect, separate logic blocks within the memory controller are dedicated to each of these functions.

A memory operations logic block 513 manages operations involving the memory device. For example, as is well-known, NAND flash memory typically utilizes incremental programming—that is, array control circuitry for the flash memory device uses a minimum programming voltage, and results of programming are checked against contents of a write data register to determine whether those results are correct. This is performed using a "program-verify" (P/V) cycle having separate "program" and "verify" phases as referenced earlier. During validation, a programmed page is typically sensed and an exclusive-or function is performed with contents of the write data register; for any bits that remain set, programming has not been effective, so the programming voltage is raised and the process repeated in a second P/V cycle. This process typically continues until proper programming has been achieved or some limit has been reached, the latter case resulting in a write error. The memory operations logic block 513 performs control over these various phases of programming using buffers 515. Since a memory device can include multiple planes (as referenced above), the memory command processing logic block 515 optionally uses multiple buffers, for example, with one dedicated to each plane or with buffers assigned on a rotating basis for individual commands received from the host. The memory command processing logic block also manages any functions of reporting write error and consequent remapping of data, as well as updating L2P mapping information in metadata storage 511 (for embodiments that perform such mapping). Note that this information can be part of a much larger class of metadata indexed by EU or LBA as discussed above (see, e.g., FIGS. 6B-6C and the accompanying discussion below for examples on types of information that can be tracked using this storage).

Commands relating to the return of query information (e.g., synchronous commands) or the setting of an operating mode (e.g., asynchronous commands) are sent to query/management logic block 517. Generally speaking, the host can request (a) return of raw information for the entire memory space managed by the memory controller, or for specific address ranges or EU ranges, or (b) processing or filtering of that data by the memory controller. For example, the memory controller can be provided with logic operable to receive and interpret host commands for lists of blocks, e.g., the "top ten" candidates for garbage collection, ranked in order of page (under) utilization. Since the purpose of such an operation is to identify EUs for erasure, a memory controller receiving such a command interrogates the metadata storage to (a) identify EUs that are at least partially in use, (b) identify the extent of page utilization for each such EU, and (c) order a set of EUs that are candidates for erasure in the order of greatest number of released pages. The query/management logic block 517 uses internal registers 519 to manage functions like this and, when the requested processing is complete, the query/management logic block sends a reply message to the host with the requested information. Note that the host interface 505 includes buffers that receive this data, and queue the data for transmission to the host (e.g., as a reply packet that may be distinguished from read data). The mentioned example is only one type of query that can be processed by the host, i.e., there are many types of requests and queries that can be processed by a memory controller, for example, queries related to wear metrics and/or persistence, age, hot-cold, or other types of information. For example, as referenced previously, a cooperative memory controller can track hot/cold data and can identify associated logical or physical addresses, and can sort and provide prioritized lists to a host (e.g., top ten "hottest" logical address pages in terms of read frequency, or top ten least or more worn EUs or physical pages in terms of wear); such a memory controller can even identify wear for memory locations corresponding to data having a specified logical address, and directly sort physical location wear indexed by logical address of data. A skilled designer can implement any type of management processing desired. This request is an example of a synchronous query, because data is on-hand for the memory controller, and because the memory controller returns requested data as soon as its query processing is complete. In a simplified case, the host can request return of raw metadata (e.g., all data or data of a specific type for a specified address). For asynchronous queries or functions, the host typically provides a parameter (such as a mode setting and/or a host-selected threshold of some type) and the memory controller then operates a continuous or intermittent process to check for the specified condition; when the condition occurs, the memory controller immediately alerts the host, typically providing information that triggered the alert (such as EU and/or page identity and metadata for the EU pertinent to the function being tracked). That is, if the condition does not occur, there is no responsive alert sent to the host, and the condition is monitored for occurrence at any time in the indeterminate future. As should also be apparent, sophisticated queries can be run that involve multiple metadata parameters. For example, a host might request an alert any time a partially written EU simultaneously reaches a specific page utilization threshold (e.g., less than 50% utilization) and has a time since last data access greater than a second threshold, or that has a predefined relationship (e.g., a percentage) of released physical pages to active physical pages, and so forth. Many examples of asynchronous processes are possible and will no doubt occur to the skilled memory architect. Once again, any suitable thresholds or modes are stored in registers 519.

A media icon 521 is depicted to indicate the use of software or firmware by the memory controller. The memory operations and query/management logic blocks 513 and 517 and registers 519 are all depicted within a dashed-line box 523 denoting that, in one implementation, these elements can optionally reside on a single die (e.g., a single processor or coprocessor); in such an embodiment, the media icon 521 typically denotes the use of firmware, for example, stored in memory within the single die in question. In this regard, such firmware can be designed to respond to vendor-specific NVMe extensions to implement specific query/management functions. For example, any desired asynchronous query can be implemented as a function call supported by firmware; when the asynchronous command in question is triggered, it is run as an open process in the die (523) or a coprocessor dedicated to the query/management functions. Alternatively, many processors can be provided, each assigned queries/asynchronous processes as they are invoked. As implied earlier, a specific asynchronous process can be associated with a mode set by the host; for example, in one mode defined by the host, the memory controller can automatically alert the host any time it identifies a space reclamation (garbage collection) candidate, based on default or host-identified parameters—in a second mode, this function is turned "off." Note that in the future, newer versions of standards such as NVMe can be structured so as to inherently support generic commands calls consistent with the operations discussed above.

The metadata storage 511 is indicated as separate from dashed-line box 526, reflecting that the metadata storage optionally can exist independent of the processing logic, e.g., on a separate die. That is, in one embodiment, the metadata storage consists of nonvolatile memory, such that it is persistent in through power cycling. In another embodiment, the metadata storage can exist in SRAM (e.g., internal to optional die 323), with data switched to nonvolatile memory and loaded back again in response to power cycling. In still another embodiment, as denoted by optional connection block 525, the metadata storage can be read directly by the host, i.e., via a form of commands for direct memory access. In such an embodiment, the host simply reads a special memory location which it knows will contain metadata for a specific EU or EU range, or for the flash memory as a whole.

Once again, while illustrated in the context of a flash memory controller, cooperative functions and supporting logic and infrastructure can also be applied to other memory controller designs, particularly for NV memory types.

Figure 5B:
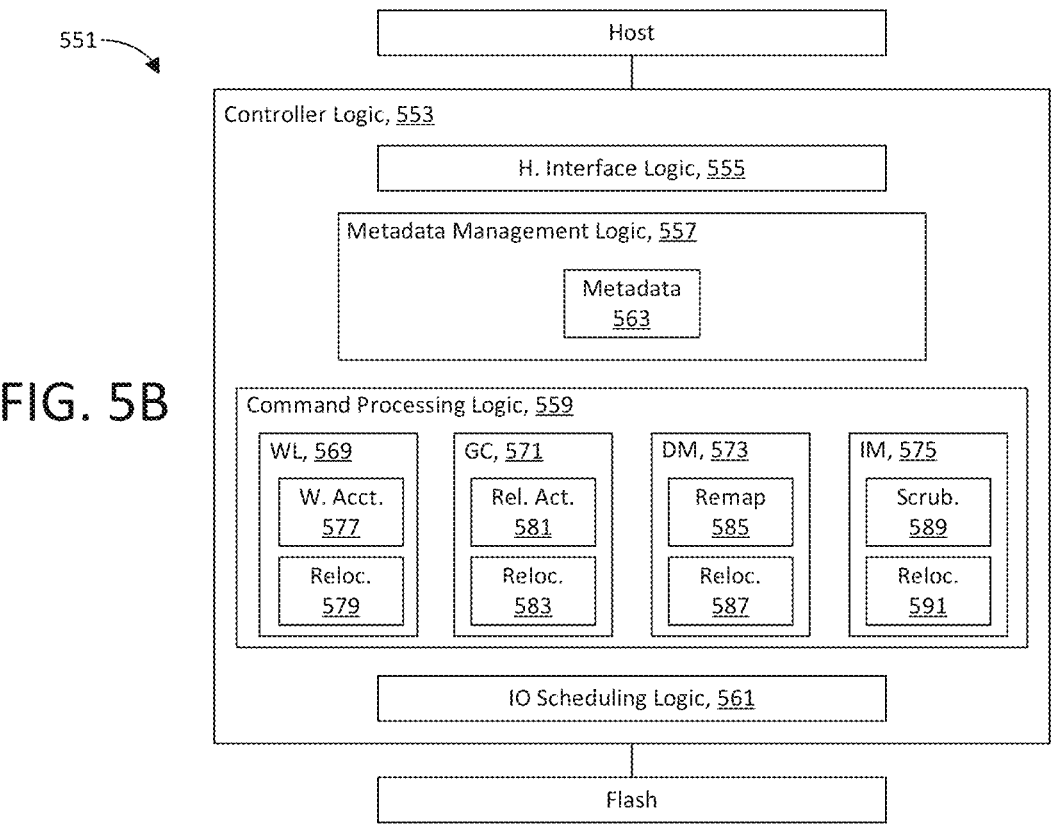
FIG. 5B shows another block diagram of a cooperative memory controller.

FIG. 5B shows a block diagram of another cooperative memory controller 551; more particularly, FIG. 5B is used to show how logic functions can be implemented using hardware and firmware logic 553. This logic 553 supports a number of optional processing features. In one embodiment, this memory controller uses this logic to perform many traditional flash controller functions (e.g., management of an FTL and associated search trees). This is to say, while one advantage of the memory controller 551 is the substantial reduction or omission of an FTL layer, this is not required for all embodiments as noted earlier. In another embodiment, the memory controller implements comprehensive cooperative functions that help reduce the need for complex FTL processes, as referenced above.

For the embodiment of FIG. 5B, logic 553 is seen to have a number of basic function blocks, including interface logic 555 to interact with the host using packetized commands and responses, logic 557 used for local metadata management, command processing logic 559 used for query processing and other management functions, and IO scheduling logic 561 used to manage memory transactions (e.g., program and erase operations). As noted, even in an embodiment where it is desired to substantially reduce the FTL layer, a memory controller can still optionally implement some address translation, for example, for defect remapping as well as other functions. The metadata management logic 557 maintains locally-stored information in the form of metadata 563, as mentioned, for each unit of memory of the memory device. Non-limiting examples of information that can be tracked are once again discussed below in connection with FIGS. 6B-6C. This information can include L2P or P2L mappings for each memory unit; that is, even for an embodiment where the host uses direct physical addressing, a scheme of shared address assignment responsibility can be implemented, with the memory controller assigning physical addresses based on an initial logical address specified by the host, with the memory controller reporting back assigned physical address(es) to the host, for the host to build a L2P table for future reads to the data. This shared addressing scheme can also optionally be employed for certain other delegated functions, e.g., valid data relocation, unit erase, garbage collection, defect management and other functions. Note that this is not required for all embodiments, i.e., a host can also support these functions and dictate physical addresses for new writes. In many embodiments described below, an adaptable memory controller architecture provides implementation flexibility in assigning specific tasks to either host or memory controller. To these ends, the metadata management logic can include structure to assign physical address and generate updates to stored metadata 563 and to report back to the host an index of physical locations assigned the newly-written file for situations where address assignment is to be performed by the memory controller. The metadata management logic also helps manage the context metadata for the memory controller, as discussed previously.

To provide another example of use of a limited address translation scheme notwithstanding address directed by the host, as previously introduced, a memory controller can be configured to identify write error and to transparently remap the subject data over to reserved memory space. Because such reassignment might affect only a very small portion of data written to memory, the memory controller can advantageously keep track of this reassignment using the metadata 563. Future reads specifying the remapped EU are intercepted by the memory controller logic using locally-stored metadata 563 and redirected to the proper physical location in memory for defective blocks. In this manner, the memory controller is freed from having to implement extensive search trees to find physical locations based on supplied logical addresses, i.e., the memory controller need only track defective memory reassignments, which ultimately become stale as the memory controller progresses through erase operations, garbage collection and updates of data (the latter being directly written to new pages or EUs). Note that such addressing can be made even simpler if memory controller simply allocates remapped space to a reserved EU using a like page assignment/offset, i.e., as discussed earlier.

The command processing logic 559 receives commands from the host directed to general configuration of memory operations and for queries. Generally speaking, this logic manages and updates the metadata 563 and runs queries on the metadata, returning information to the host as appropriate via the host interface logic 555. The returns to the host can be immediate returns to synchronous commands and immediate or later responses (or alerts) to asynchronous commands. Exemplifying some command options, the command logic can (a) serve information up to the host drawn from metadata 563 for use in wear aware writes, and (b) assist with wear leveling (WL), garbage collection (GC), defect management (DM) and integrity management (IM) functions in memory. Note that in network storage applications with multiple drives, this further enables certain novel host capabilities, as will be described in the section dealing with an exemplary storage system further below. Note also that in some embodiments the host can also directly access raw metadata, e.g., as a form of direct memory access.

An exemplary memory controller can assume varying levels of host support in a manner that can be customized to any specific memory system design. That is, memory controller 551 optionally possesses dedicated logic infrastructure to perform WL, GC, DM and IM specific functions (569, 571, 573 and 575, respectively), each of which can be configured/tailored to a specific level of interaction with the host pertinent to the specific implementation. Depending on the desired level of interaction, the memory controller 551 helps avoid the need for remote storage and retrieval of large address translation tables and the use of complex search trees, e.g., address translation can be performed using a greatly simplified address translation table or omitted in the memory controller entirely. In addition, the configured level of cooperation can advantageously permit a host to directly assume scheduling of many flash management functions that might interfere with (i.e., compete with) host-directed writes, such as garbage collection, data relocation, wear leveling and so forth. This, combined with less FTL overhead, provides for faster, more consistent flash response, and facilitates multiple drive storage aggregates based on solid state (flash) drives (SSDs) as well as mixed or heterogeneous systems that combine SSDs with other memory types.

Note that this is an example only, e.g., the architecture described herein can optionally also support a traditional FTL design, or memory controller management of complex functions.

To assist with host scheduling of flash management tasks, the memory controller can have firmware or hardware logic (or both) dedicated to specific types of host commands and host queries. In the embodiment of FIG. 5B, this structure is illustrated as optionally including structure to assist with wear leveling (WL), garbage collection (GC), defect management (DM) and integrity management (IM) functions, but other functions or logic can also or instead be used. To support these functions, the memory controller uses command processing logic 559 to manage space allocation and space reclamation, and otherwise to service host calls for the return of management data. For example, this command processing logic can facilitate direct physical addressing by identifying for the host available (i.e., available, erased) address space, candidates for erase (released space), candidates for data relocation and garbage collection (e.g., based on low page utilization), assistance with cold data location (e.g., wear leveling), or more general functions.

For both embodiments that use wear-aware writes as well as those that do not, the memory controller can include wear leveling logic 569. That is, to account for a limited number of flash memory P/E cycles (typically on the order of tens to hundreds of thousands of cycles for NAND flash), the logic on board the memory controller can be designed to track wear as part of metadata 563 and to provide this information to the host. If over time, certain units of memory are determined to represent disproportionately high or low wear relative to overall memory, wear leveling can then be performed. Note that for embodiments where wear-aware writes are used, wear leveling can be highly localized, i.e., performed as a data relocation option simply to redistribute cold data. The memory controller 551 can generate alerts when predetermined wear thresholds are reached, and can otherwise perform low level queries relating to wear leveling. In support of the techniques presented by this disclosure, the wear accounting logic 577 can keep a changing-list of EUs, ranked in order of coldest data, least wear, greatest wear or in another manner. In one embodiment, this logic can be prompted via an explicit host command to synchronously compile such a list or to asynchronously notify the host of EU identity any time a wear metric (e.g., EU erase count) exceeds a programmably-defined value. Then, when and as wear leveling is scheduled by the host, the host issues a command to the memory controller to relocate cold data and erase the old space (e.g., using relocation logic 579), thereby redistributing that space into a pool of available space used for active writes (and potentially more frequently-cycled data). Note that in an embodiment where the host directly addresses physical space and performs wear-aware address assignment, distribution of wear can be inherently minimized as part of the write process. However, disproportionate wear can still occur for data that is held for a long time and which is therefore deemed "cold;" that is, cold data can keep EUs out of circulation while other EUs are more frequently recycled. The memory controller architecture presented by this disclosure supports memory controller cooperation with wear management through the use of "limited" data relocation and wear leveling processes (e.g., directed only to specific address ranges within flash) as well as (if pertinent to the implementation), the scheduling and management of more extensive wear leveling, e.g., for entire flash devices or across multiple flash devices or drives.

As alluded to earlier, a copy-on-write process can result in retaining old pages in flash memory that are stale. This is because a given EU can have other pages that are still in use, and the old page location typically cannot be reused until the entire associated EU is recycled. Over time, substantial portions of flash memory can be locked up simply because a small fraction of space in many respective EUs is still in use. This situation can occur whether the host or the memory controller (or both) perform address translation. To address this, the memory controller of FIG. 5B therefore uses garbage collection logic 571 to assist with functions of periodically consolidating data. That is, the garbage collection logic can track information pertinent to whether an EU is mostly stale or is still efficiently being used and can process host queries relating to this information. One form of this tracked information is page utilization information, e.g., where the memory controller stores information indicating whether each page in a given EU is available (erased but not yet written), has valid data (cannot be written to without an erase), or is released (a page with stale data that cannot be rewritten until it is first erased). Garbage collection involves accounting for released pages, for example, using release accounting logic 581 to track the mentioned page utilization information for each page (or other logical unit) for each EU; EUs with relatively few used pages can have those pages consolidated with pages from other EUs having similarly low page utilization, with the then-concentrated valid date being rewritten to a new destination. In an embodiment where the memory controller tracks this information, the memory controller can compute an extent of page utilization (e.g., 10% valid data) and can provide this information to a host with EU identity to permit the host to decide which EUs should have data consolidated and moved. The host can then schedule any resultant operation in a manner that does not compete for needed read data elsewhere in the subject memory. Note that "page utilization" as used herein generally refers to the extent to which pages of a given EU are valid (in use) or are stale or not in use. For example, if most pages in a given EU were stale or unused and only a few pages of the EU had valid data, the extent of page utilization in the given EU would be low. Conversely, if most pages in an EU were in active use, the extent of page utilization for the given EU would be high.

In an embodiment where the host cooperates with the garbage collection task, the host can query the memory controller using a command, with processing of the command performed in cooperation with the release accounting logic 581. In more detailed embodiments, the release accounting logic can be designed to perform low level inquiries, for example, to return a list of EUs where page utilization falls below a specific threshold (e.g., 50%). Such a list can be further prioritized, for example, in terms of EU wear, persistence, age or hot-cold status of any remaining valid data, and so forth. Such a prioritization or other sorting or indexing function can also be managed as an asynchronous task, e.g., the host can request that the memory controller alert the host if at any time an EU that has been written-to (or that has just had a page released) experiences less than a threshold level of page utilization; in this regard, the release accounting logic 581 tracks explicit page release with each command information update, and can perform any processing necessary to alert the host in response to any asynchronous queries. The release accounting logic 581 also has circuitry and/or firmware that performs other forms of processing, for example, optionally providing a list of "the 10 best" candidates for garbage collection in the desired order. In another embodiment, some or all of the data relocation functions can be managed by the memory controller, for example, with relocation logic 583 being delegated specific tasks by the host (such as the identification of EUs to the host for relocation of data, or relocation of data in response to a host-specified "available" target memory address within the same tier, selected according to wear). Once relocation has been performed, with respective L2P mappings updated and associated physical pages are released, the full EU which has just been fully released is reclaimable. In one embodiment, this is performed by the host, which issues an explicit EraseBlock command for an address-specified EU conveyed as part of the explicit EraseBlock command—logic 555 processes this command and, once the command is completed, returns the freed EU to a pool of available EUs for future data allocation.

Write and erase errors discovered by the flash memory controller are handled by defect management flash management logic 573. Pages found defective due to write error are remapped by defect remapping logic 585, with write operation retried transparent to the host. The original page in error is marked defective or "bad" and added to a bad block list or map to avoid further use of associated physical pages. Unit relocation logic 587 performs background relocation of data that experienced write error to minimize possibility of further write errors. Unit erase errors are handled by the defect management logic as well, with defective EUs also reflected on a bad block list kept by the flash memory controller. As indicated, in such a scheme, the entire EU can optionally be moved, preserving relative page layout and simplifying translation issues.

While flash memory typically provides strong error detection and correction (EDC), the memory controller may also provide onboard data integrity management logic 575. Data scrubbing logic 589 is responsible for background data integrity checks based on EDC or additional data integrity metadata. Suspect blocks with transient errors identified are relocated by suspect relocation logic 591 using mechanisms similar to wear leveling and garbage-collection relocation processes described above.

As operations are performed in memory, whether as part of a management operation (such as data relocation) or in servicing a write or read command, IO scheduling logic 561 detects completion of the command. Pertinent information is added by metadata management logic 557 to the stored metadata 563 for the pertinent EU, and the host is then signaled with any completion codes as necessary. For example, if a data relocation operation has been performed, the metadata 563 can be updated with new information for both source and target blocks of memory (e.g., new page release information, L2P and P2L mapping, wear information and so forth), and the host can be signaled with new physical addresses for relocated valid data.

Note that, depending on embodiment, the flash memory controller can support one or more of the functions or units of logic described above, i.e., a memory controller can include subsets of the described logic to assist in the performance of specific tasks. For example, one hypothetical memory controller could omit the data relocation logic 583 if the host was to perform this function. Also, other logic functions can also be supported or provided for beyond those discussed. As mentioned, the embodiment of FIG. 5B presents a single memory controller architecture adaptable to multiple, different implementations, but this is not required for all embodiments.

Clearly, many examples exist for the layout of a cooperative memory controller. In various embodiments, these layouts can support different cooperative functions.

As noted earlier, and in connection with the U.S. Patent Application for "Techniques for Data Migration Based On Per-Data Metrics and Memory Degradation," a host can also store (separate, second) metadata and can use such (second) metadata to perform various actions in association with "context" metadata returned by a memory controller. For example, a memory controller can be commanded by the host to store "context" metadata for specific memory locations which is then returned to the host when specific maintenance events arise; the memory controller does not necessarily have, depending on embodiment, a complete understanding as to the nature of data, merely that the status of a physical storage location is X and that the host should be alerted to this fact. The context metadata matching the LBA stored in that physical storage location is provided by the memory controller to the host, enabling the host to ascertain context dependent on the metadata provided by the memory controller and other metadata maintained by the host. The host might independently maintain, for example, depending on embodiment, additional metadata (e.g., such as data age or read or write frequency, indexed by LBA); upon receiving the context metadata from the memory controller the host in this case can use that context information to locate the other (e.g., "second") metadata, which can then be leveraged for efficiency purposes. To cite an example, if the memory controller alerts the host that physical page X must be moved to make way for a block erase, and returns back references or some type of pointer, the host can use that information to locate information tracked by the host (e.g., by file name or LBA) that provides additional context, and for example, suggests that the data for the associated LBA should be stored in DRAM instead of flash for performance reasons. Clearly, any number of possibilities exist with metadata being tracked by the host or the memory controller, with such metadata being combined or used in dependence on the context information (e.g., back references) returned by the memory controller to the host.

In one contemplated application, drawn with reference to the methods described in "Techniques for Data Migration Based On Per-Data Metrics and Memory Degradation," referenced earlier, context can be used to help match data to specific tiers of memory or to individual physical memory locations within any given tier. For example, context can be used to group like types of information together to provide for consistent wear across an EU, plane, die, channel or other hierarchy level, or to match specific data to specific EUs to better manage wear, or for other performance-motivated reasons. Note that moving data in this manner (e.g., moving frequently written LBAs to relatively virgin EUs and, conversely, infrequently written LBAs to relatively worn EUs) will inherently tend to level wear, thereby reducing the need for wear leveling relative to some conventional schemes.

FIG. 6A is a diagram that shows possible host actions 601 which relate to context (e.g., metadata and other information that can be used by the host to understand the nature of data at a particular physical memory location).

First, as referenced by numeral 602, a host or memory controller or both cooperating together can establish configuration parameters for the metadata system. A memory controller can specifically export supported metadata format to the host or, for example, be programmably configured by the host (depending on architecture) to establish accord as to the metadata scheme that will be used. For example, the host and memory controller can establish handshake as to the size of a metadata block (e.g., in bytes) for each LBA, or to specify submission mode on write (e.g., interleaved with data, using a specific, supported command to write metadata, by write to a prearranged buffer, or at a configurable offset within a data block committed to memory); other structures can potentially be used too. Note that such handshake or configuration may occur when the memory device supported by the said controller is first attached to the host system, or when an already present device layout is being reconfigured. The particular protocol used for exchange of and storage of context metadata can vary according to implementation. For example, one optional scheme for storing context metadata can be supported according to existing standards; T10 DIF data protection can optionally be used for this purpose, as indicated by FIG. 6A (e.g., using SCSI or NVMe storage protocol)s. A T10 DIF-compliant scheme provides for configuring the layout of the protection information, including "guard," "application tag," and "reference tag" fields, and system-controller interaction on storage and retrieval of the data block with protection information attached; to apply this scheme for context metadata storage, the T10 DIF application tag and reference tag fields are utilized to store 4-6 byte wide host-provided context metadata together with underlying data, with the guard field (i.e., checksum) further utilized to provide metadata and data integrity protection. Client read and write operations may further utilize the protection information pass mode that prescribes the memory controller to store the system-provided block-level protection metadata, including the application tag and reference tag fields (i.e., comprising the data item context), for write operation and pass back metadata to the host on read or metadata query operation. As an alternative, an arbitrary context metadata size can be configured on a device partition or other "virtual device" basis during the initial device configuration or when an extant device is being reformatted (e.g., see FIGS. 4A-4D, discussed above for some exemplary configurations). Once data item context metadata size has been configured, memory controller will expect any write operation addressing a memory device under the memory controller's management to be accompanied by metadata, providing context metadata of the configured size for each data block to be transferred. Clearly, many examples are possible and will no doubt occur to those having ordinary skill in the art. Similarly, many different schemes also exist for returning metadata, for example, responsive to explicit metadata query, automatically as an "asynchronous" operation (e.g., at times when a condition precedent is satisfied), or in another manner; for example, context metadata can be returned for each data block being read by the storage system software, in a separate metadata buffer, and/or provided in response to a relocation candidate query command.

A host can use metadata (including back references and other metadata, stored by the memory controller for a given storage drive, stored locally to the host or in some other manner) to understand context of data found in a specific storage location. Per numeral 605, the back references can identify source file, application, and/or other data used at any particular level of indirection used by the client or host, with such information being consciously written into memory, in addition to the subject data, at the time of (or in close proximity to) a host write. In one embodiment, as noted, the back reference information comprises a string or any other identifier indicating all forward references used by the host and/or client and/or memory controller; thus, the back references can identify not only logical address from the vantage point of the host but, for example, early "staled out" versions of data which are still in memory but which have been replaced in a log structure write storage scheme (e.g., the back references can include one or more roots, inodes, iblocks, checkpoints, version information or other data), references used to ascribe data to multiple clients, and nearly any other information suitable to the embodiment. This back reference data can be maintained by a memory controller and provided to the host upon host query or unsolicitedly, for example, in response to detection of a threshold condition in memory or a need for a maintenance event, signaled from a cooperative memory controller to a host (see the U.S. Patent Applications for "Cooperative Flash Memory Control" and "Multi-Array Operation Support And Related Devices, Systems And Software," referenced earlier), under situations where the host might not inherently have information associated with a given physical address location that requires maintenance. The host uses this information, potentially with other metadata, to identify the data that is to be the subject of maintenance and select a destination memory location for it. For example, per numeral 607, the host can change the memory type of the block device (virtual or otherwise) used for specific data that is inappropriately matched to media type (as determined from context), or that would be better matched to a different media type in view of performance or other considerations. Two examples of this (as discussed in the materials incorporated by reference) include storage of data in view of read frequency characteristics (609, e.g., data associated with a LBA can be repositioned for performance reasons, per numeral 611, in either a different memory type of block device), or age or write frequency (613), with the destination selected based on relative wear of various available physical memory locations (e.g. per numeral 615, for the specific case of flash or other program/erase asymmetric media types). Processes can be used to find and move "cold" data around to better distribute wear for LBAs that are only infrequently changed, as indicated by numeral 617. Naturally, there are other considerations (e.g., elevated temperature) that might counsel maintenance operations dependent on memory type, and context information and other metadata can be used to assist with these processes as well.

FIG. 6B provides an example of some types of metadata that can be stored in a manner indexed to physical memory location (e.g., erase unit, die, plane, physical page, and so forth). For example, an entry for each host-accessible physical memory location managed by a given memory controller can include: state 651 (i.e., physical condition of the cells, such as whether one or more cells associated with the location are bad, or cannot be corrected given any resident error-correction scheme), status 652 (whether the location is virgin, i.e., erased, holds active data, or represents "released" data), and wear 653 (e.g., including information metrics such as erase count, programming count, bit error rate, or other measures associated with memory location lifecycle). Note that this information can be retrieved separately from information tied to a specific LBA so as to, for example, select target destinations for new writes (e.g., to perform wear leveling). Metadata can also including information indexed by physical address location, but tied to the data stored at that location, for example, data age 654, read count 655, LBA 656 (i.e., logical address of the data used by the host to address that data), page release information 657, a bitmap that identifies state for one or more lower hierarchical storage levels, 658, a remap flag 659 (e.g., indicating that location for a given LBA has been remapped or moved), a timestamp 660, read frequency 661, write frequency 662, a hot-cold data status identifier 663, one or more back references 664 and/or other information 670.

As mentioned earlier, such data can also be stored in a second table if desired, e.g., indexed by LBA. In this regard, FIG. 6C shows an example of some types of metadata that can be stored in such a table, for each logical block address 680 (e.g., or other unit of hierarchy in a logical addressing scheme). For example, an entry for each logical block address can include: data age 681, read count 682, LBA 683 (i.e., logical address of the data used by the host to address that data), page release information 684, a bitmap that identifies state for one or more lower hierarchical storage levels, 685, a remap flag 686 (e.g., indicating that location for a given LBA has been remapped or moved), a timestamp 687, read frequency 688, write frequency 689, a hot-cold data status identifier 690, one or more back references 691 and/or other information 695.

As with the other FIGS. discussed above, each of FIGS. 6A-6C should be understood as providing non-limiting examples only, that is, not all of the listed data must be maintained by a memory controller, and each identified field should be viewed as optional. Similarly, there are also many other types of tasks beyond those tasks illustrated in FIG. 6A, and many other types of metadata, beyond the metadata specifically exemplified in FIGS. 6B-6C, which can be used.

Generally speaking, cooperative management tasks can be grouped according to three primary categories: Defect Management, Wear Leveling Management, and Garbage Collection Management. The cooperative memory controller-host described earlier and in the incorporation by reference materials provides a unique way of handling these management functions in a way that can be customized to the specific implementation, that is, to assist with the data migration methods discussed herein. That is, a single memory controller design can support a number of configurable options (or modes) for allocating responsibility for tasks. Prior to discussing these options, however, it would first be helpful to revisit some of the capabilities provided by the structure described above. Once again, in one embodiment, information can be tracked by the memory controller and made accessible to the host in a manner that helps reduce reliance on a memory controller to maintain detailed address translation tables. Many of the operations which might traditionally compete with host read/write requests will instead be managed by the host, i.e., such that tasks are scheduled so that there is no competition.

Note that the examples provided above provide an example of a storage architecture where data is stored in a first address space, and metadata corresponding to that data is effectively stored in a second address space (although in association with the underlying data) or otherwise in a manner that creates a linkage between two memory spaces. For example, a host can write data according to logical address under circumstances where a flash or other memory controller selects a physical destination location (and in so doing, creates an address mapping from logical to physical memory space). The data is accessed by the host, for example, in a read operation, by logical address. When the need for maintenance arises, for example, a wear leveling or garbage collection operation, or potentially a refresh operation, the memory controller identifies a physical address location that is to be the subject of the desired maintenance and it accesses metadata by that physical address location. "Context" metadata retrieved in this manner effectively links the two address spaces; in one manner, this linkage goes beyond simply provided reverse address translation (e.g., identifying LBA) but rather, provides information that permits a host to update its forward reference tables, or otherwise identify and/or locate specific files and objects of interest. As noted earlier, the provided "handle" or linkage can be comprehensive or abbreviated, e.g., it can provide a link to another file or table where other "context" can be obtained. It is not, strictly speaking, necessary that such context metadata stored by the memory controller in association with underlying data be globally unique, as long as it can be combined/used by the host and/or file system for the purposes described above.

The description presented above provides examples of storage system architectures, data migration methods and various related memory management techniques. As indicated, these techniques can optionally be employed with any one or more of these components. Further, in the system context, certain functions have been exemplified as being performed by a memory controller or host, but may be performed by the other depending on implementation, or by plural memory controllers. While certain tiers of memory (e.g., SSDs, DRAM, HDDs, etc.) have been described as generally having their own, dedicated controllers, it is possible to have multiple types of memory managed by a single controller, i.e., with a drive or memory itself constituting a hybrid. Further, while some embodiments have been described having two tiers of memory, but it is possible to have a single tier of memory (e.g., all NAND-flash), or three or more tiers of memory, as appropriate to the particular method and application. Some embodiments may omit one or more of these in favor of other memory types, for example, the HDDs can be omitted, or a different type of storage media can be used.

It should be noted that the subject matter disclosed herein can be expressed (or represented), as data and/or instructions embodied in various machine-readable storage media, meaning physical non-transitory media such as computer memory, storage disks and the like. In this context, the described subject matter can take the form of instructions or data for fabricating an integrated circuit (or integrated circuits) that, when built and operated, possesses the circuits and structures, and performs the techniques described herein. An output of a process for designing an integrated circuit, or a portion of an integrated circuit, comprising one or more of the circuits described herein may be such a computer-readable medium such as, for example, a magnetic tape or an optical or magnetic disk, or other non-volatile physical storage. The computer-readable medium may be encoded with data structures or other information describing circuitry that may be physically instantiated as an integrated circuit or portion of an integrated circuit. Although various formats may be used for such encoding, these data structures are commonly written in Caltech Intermediate Format (CIF), Calma GDS II Stream Format (GDSII), or Electronic Design Interchange Format (ED/F). Those of skill in the art of integrated circuit design can develop such data structures from schematic diagrams of the type detailed above and the corresponding descriptions and encode the data structures on computer readable medium. Those of skill in the art of integrated circuit fabrication can use such encoded data to fabricate integrated circuits comprising one or more of the circuits described herein. Some or all of the functions described above can also be embodied as instructions stored on machine-readable media, including software code or firmware that, when executed, cause a machine (e.g. a microprocessor or device having a microprocessor) to perform the described functions. Generally speaking, any such instructions can be alternatively implemented as hardware logic, or a combination of hardware and software logic, depending on implementation.

The foregoing description and in the accompanying drawings, specific terminology and drawing symbols have been set forth to provide a thorough understanding of the disclosed embodiments. In some instances, the terminology and symbols may imply specific details that are not required to practice those embodiments. The terms "exemplary" and "embodiment" are used to express an example, not a preference or requirement.

Various modifications and changes may be made to the embodiments presented herein without departing from the broader spirit and scope of the disclosure. Features or aspects of any of the embodiments may be applied, at least where practicable, in combination with any other of the embodiments or in place of counterpart features or aspects thereof. Accordingly, the features of the various embodiments are not intended to be exclusive relative to one another, and the specification and drawings are to be regarded in an illustrative rather than a restrictive sense.

We claim:

1. A storage device comprising:
   flash memory having erase units, wherein the flash memory is to have one or more namespaces at a first hierarchical level, and groups of one or more of the erase units at a second hierarchical level;
   a host interface to receive a write request and, in association with the write request, a designation of a specified namespace of the one or more namespaces, write data, and an associated handle that indicates context for the write data;
   logic to cause the storage device to
      select one of the groups, dependent on the handle, the selected one of the groups being associated with the specified namespace,
      store the write data in the one or more erase units of the flash memory which are associated with the selected one of the groups,
      track write data validity information for the one or more erase units of flash memory which are associated with the selected one of the groups; and
      dependent on the validity information, perform garbage collection in a manner dedicated to the selected one of the groups;
   wherein, as part of garbage collection performed for the selected group, the logic is to cause the storage device to copy the write data to a destination erase unit of the flash memory, the destination erase unit being selected dependent on the associated handle;
   wherein the said logic comprises at least one of (1) instructional logic stored on a physical storage medium and (2) hardware logic.

2. The storage device of claim 1, wherein the storage device is further to receive a query from a host, and wherein the logic is further to cause the storage device to process the query and responsively:
   identify the associated handle; and
   transmit to the host information representing the associated handle.

3. The storage device of claim 2, wherein the information transmitted to the host explicitly identifies the associated handle.

4. The storage device of claim 1, wherein the flash memory comprises address subspaces at a third hierarchical level, each of the groups of one or more of the erase units being associated with no more than one of the address subspaces.

5. The storage device of claim 4, wherein the storage device is further to receive a request from a host to provide to the host information identifying a number of the address subspaces.

6. The storage device of claim 5, wherein the information explicitly identifies a specific one of the address subspaces.

7. The storage device of claim 5, wherein the storage device is further to receive address information with the write request, and wherein the logic is further to cause the storage device to responsively:
   derive a first portion from the address information, and identify from the first portion the specific namespace;
   perform one or more operations to subdivide the address information and identify therefrom a second portion and a third portion; and
   identify a specific one of the address subspaces from the second portion.

8. The storage device of claim 1, wherein the logic is further to cause the storage device to store metadata for the selected one of the groups, the metadata representing a time associated with the selected one of the groups.

9. The storage device of claim 8, wherein the storage device is further to receive a request from the host for status information associated with the groups, and wherein the logic is further to cause the storage device to responsively:
   identify the status information from the metadata; and
   transmit the status information to the host.

10. The storage device of claim 8, wherein the time is associated with programming of the write data into the flash memory.

11. The storage device of claim 8, wherein the time is associated with an amount of time since data was programmed.

12. The storage device of claim 1, wherein the logic is further to cause the storage device to store metadata for the selected group, the metadata representing an extent to which additional write data can be programmed into the one or more erase units of flash memory which are associated with the selected one of the groups without erasure of the one or more erase units.

13. The storage device of claim 1, wherein the storage device is further to receive, from a host, a request, and wherein the logic is further to cause the storage device to responsively:
   identify a size corresponding to the selected one of the groups; and
   transmit to a host information representing the size corresponding to the selected one of the groups.

14. The storage device of claim 13, wherein the amount of storage space exactly corresponds to a non-power of two number of storage locations in the flash memory.

15. The storage device of claim 13, wherein the size corresponds to a maximum writeable capacity corresponding to the selected one of the groups.

16. The storage device of claim 1, wherein the flash memory comprises planes, and wherein at least one of the groups comprises erase units on different ones of the planes.

17. The storage device of claim 1, wherein the logic is further to cause the storage device to track an extent to which additional write data can be programmed into the one or more erase units of flash memory which are associated with the selected one of the groups without erasure of the one or more erase units.

18. The storage device of claim 17, wherein the storage device is further to receive a request, and wherein the logic is to further cause the storage device to responsively:

identify the extent to which additional write data can be programmed into the one or more erase units of flash memory which are associated with the selected one of the groups without erasure of the one or more erase units; and transmit to a host information representing the extent to which additional write data can be programmed into the one or more erase units of flash memory which are associated with the selected one of the groups without erasure of the one or more erase units.

19. The storage device of claim 1, wherein:

the one or more groups include two groups, including the selected one of the groups and another group;

the logic is further to cause the storage device to:

track metadata for each of the two groups, and to transmit to the host status information for each of the two groups, dependent on the metadata;

receive at least one command relating to performance of garbage collection that causes the storage device to perform said garbage collection for the selected one of the groups in a manner triggered by the host; and the at least one command causes the time to be selectively different for flash memory associated with the selected group relative to flash memory associated with the other of the two groups.

20. The storage device of claim 1, wherein the logic is further to cause the storage device to:

store a value that represents a size corresponding to the selected one of the groups;

track metadata for each corresponding one of the groups, wherein the metadata for each corresponding one of the groups represents an extent to which the corresponding one of the groups can continue to receive writeable data without erasure;

receive a maintenance command from a host, wherein the maintenance command specifies the selected one of the groups; and perform maintenance, responsive to the maintenance command, a which changes the extent the corresponding one of the groups can continue to receive writeable data without erasure of the one or more erase units corresponding to the selected one of the groups.

* * * * *